(12) United States Patent
Yoshie

(10) Patent No.: US 7,535,523 B2
(45) Date of Patent: May 19, 2009

(54) ELECTRO-OPTICAL DEVICE SUPPORTING DEVICE AND METHOD OF SUPPORTING ELECTRO-OPTICAL DEVICE

(75) Inventor: Takeshi Yoshie, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 11/500,667

(22) Filed: Aug. 8, 2006

(65) Prior Publication Data
US 2007/0064447 A1    Mar. 22, 2007

(30) Foreign Application Priority Data
Sep. 20, 2005   (JP) .............. 2005-271484

(51) Int. Cl.
*G02F 1/1333*   (2006.01)
*H01J 1/62*   (2006.01)
(52) U.S. Cl. .............. 349/58; 349/60; 313/491
(58) Field of Classification Search ........... None
See application file for complete search history.

(56) References Cited

U.S. PATENT DOCUMENTS 6,771,874 B2 * 8/2004 Levert et al. .......... 385/147
6,828,721 B2 * 12/2004 Wakita .............. 313/491
7,437,028 B2 * 10/2008 Hohne et al. .......... 385/13

FOREIGN PATENT DOCUMENTS

JP   A-2003-197712   7/2003

* cited by examiner

*Primary Examiner*—Tina M Wong
(74) *Attorney, Agent, or Firm*—AdvantEdge Law Group, LLC

(57) ABSTRACT

The disclosure includes an electro-optical device supporting device, which interposes a flat flexible member extending from a held member in a vertical direction and holds the posture of the held member. The held member may include a substrate having a display region and an electro-optical material in the display region of the substrate. The supporting device includes a first member that supports neighboring portions of both ends of the flat flexible member in a widthwise direction from a lower side of the flat flexible member, and a second member that pushes down a center portion of the flat flexible member in the widthwise direction from an upper side. A concave portion is formed in the center portion of the first member in the widthwise direction. A convex portion for deforming the flat flexible member by pushing down the flat flexible member is formed in the second member so as to correspond to the concave portion of the first member.

21 Claims, 14 Drawing Sheets

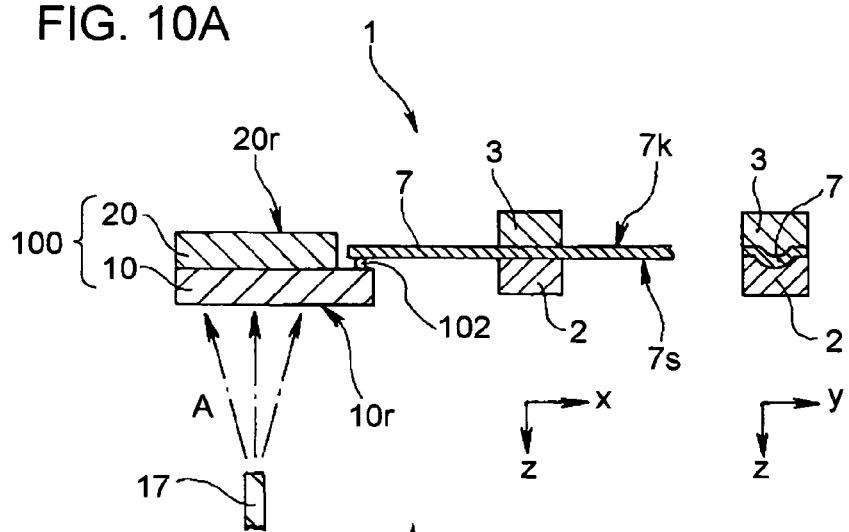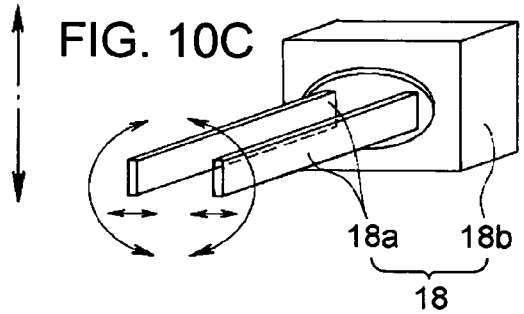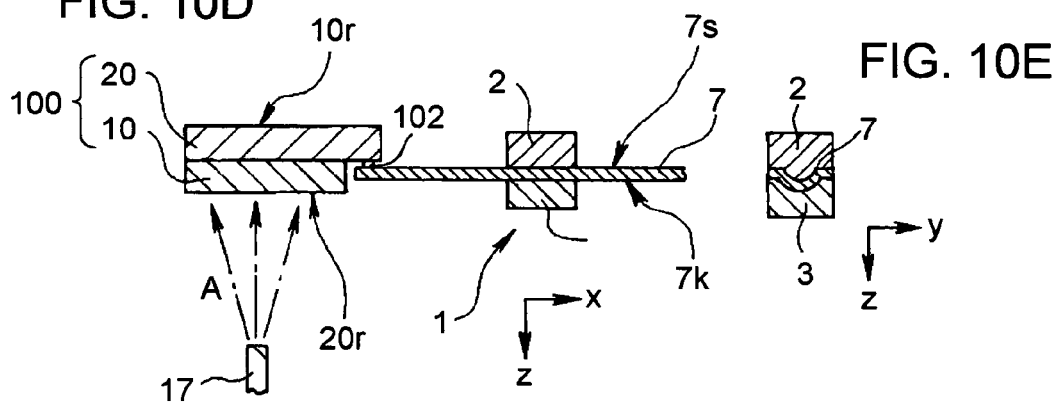

ELECTRO-OPTICAL DEVICE SUPPORTING DEVICE AND METHOD OF SUPPORTING ELECTRO-OPTICAL DEVICE

BACKGROUND

1. Technical Field

The present invention relates to an electro-optical device supporting device which holds the posture of a held member by interposing a flat flexible member extending from the held member in a vertical direction, and to a method of supporting an electro-optical device.

2. Related Art

In general, electro-optical devices, for example, liquid crystal devices have a structure in which liquid crystal is injected between two substrates, each of which is made of a glass substrate or a quartz substrate. Specifically, switching elements, such as a plurality of thin film transistors (hereinafter, referred to as TFTs) and pixel electrodes are disposed in a matrix in one substrate, a counter electrode is disposed in the other substrate, and image display is performed by varying optical characteristic of a liquid crystal layer interposed between both substrates according to image signals.

Further, an element substrate where the TFTs are disposed, and a counter substrate that is disposed to be opposite to the element substrate are individually manufactured. Then, the element substrate and the counter substrate are bonded to each other through a sealant in high precision (for example, alignment error within a range of 1 μm or less) in a panel assembling process.

The panel assembling process will be described in detail. First, alignment films for aligning liquid crystal molecules along substrate surfaces are formed on the surfaces of the element substrate and the counter substrate manufactured by processes of forming the substrates, which come into contact with a liquid crystal layer. Then, a baking process is performed, and a rubbing process is performed so as to determine alignment of the liquid crystal molecules when a voltage is not applied.

Then, in a case in which liquid crystal is injected between the element substrate and the counter substrate by using a method of sealing liquid crystal, a sealant that becomes an adhesive is coated on a sealant coating region of one of the element substrate and the counter substrate in a substantially circumferential shape, such that a notch portion is provided in a portion of the sealant. The element substrate and the counter substrate are bonded to each other by using the sealant. Then, alignment is performed, and compression and curing processes are performed. Then, liquid crystal is injected through the notch portion that is provided in the portion of the sealant, and the notch portion is sealed by a sealing member. In this way, the liquid crystal device is assembled.

Front ends of flexible printed circuits (hereinafter, referred to as FPCs), which electrically connect the liquid crystal device to an electronic apparatus, such as a projector or the like, are connected to terminal connecting portions that are disposed in the element substrate of the liquid crystal device assembled by using the above-mentioned method. In this case, the FPC is a flat member that has a specific length.

Then, exposed surfaces of the element substrate and the counter substrate in the liquid crystal device are subjected to a cleaning process using air, and dusts of the exposed surfaces are removed. Then, the liquid crystal device is carried, and a base end of the FPC is connected to the electronic apparatus, such as the projector. As a result, the liquid crystal device and the electronic apparatus are electrically connected to each other.

In this case, when various processes, such as an air cleaning process, are performed on the liquid crystal device, or when the liquid crystal device is carried, if the liquid crystal device is gripped by an operator, dusts may be adhered to the liquid crystal device from the operator, which causes defective display to occur in the liquid crystal device.

In order to resolve these problems, JP-A-2003-197712 discloses a technology in which in a state in which a held member is held by using a substrate carrying device having a carrying arm and a carrying hand connected to a front end of the carrying arm, since various processes and carrying are performed, various processes and carrying are automatically performed with respect to the held member.

However, according to the technology disclosed in JP-A-2003-197712, since the various processes and carrying are performed in a state in which the held member is held, when the held member is the liquid crystal device, cracks may be generated in an end surface of the held element substrate or counter substrate due to the carrying hand holding the liquid crystal device. Further, another technology has been known which holds the liquid crystal device by using an absorption method other than the carrying hand. However, according to this technology, the liquid crystal device may be dropped due to insufficient absorption.

In order to resolve these problems, a method has been suggested in which after a front end of an FPC is connected to a terminal connecting portion disposed in the element substrate of the liquid crystal device, various processes including a carrying process are performed in a state in which the FPC is supported. However, even in this case, since the FPC has a flexible property and a specific length, the liquid crystal device may be sagged in a downward direction that is a direction of gravity from the front end of the FPC, due to the gravity applied to the liquid crystal device. As a result, the connection between the front end of the FPC and the terminal connecting portion may be released.

Further, if the liquid crystal device is sagged downward from the front end of the FPC, when the various processes are performed on the liquid crystal device or when the liquid crystal device is carried, the liquid crystal device may come into contact with peripheral members, and cracks or the like may be generated in the liquid crystal device.

SUMMARY

An advantage of some aspects of the invention is that it provides an electro-optical device supporting device which is capable of preventing a held member from being sagged when the held member is held by supporting a flat member whose front end is connected to the held member and which has a specific length, and performing carrying and various processes with respect to the held member in a state in which the posture of the held member is held.

According to an aspect of the invention, there is provided an electro-optical device supporting device that interposes a flat flexible member extending from a held member in a vertical direction and holds the posture of the held member. The electro-optical device includes a first member that supports neighboring portions of both ends of the flat flexible member in a widthwise direction from a lower side of the flat flexible member, and a second member that pushes down a center portion of the flat flexible member in the widthwise direction from an upper side. Further, a concave portion is formed in the center portion of the first member in the widthwise direction, a convex portion for deforming the flat flexible member by pushing down the flat flexible member is formed in the second member so as to correspond to the concave portion of the first member, the flat flexible member is interposed between the concave portion and the convex portion, and the flat flexible member is pushed down and deformed.

According to this configuration, even though the flat member has a flexible property and a specific length, the center portion is curved along a longitudinal direction in a downward direction that is a direction of gravity by the concave portion and the convex portion, and the strength of the flat member can be improved. Accordingly, the held member that is connected to the front end of the flat member is not sagged downward due to the gravity applied to the held member, and the posture of the held member can be held in a state in which the flat member is interposed in a vertical direction. Therefore, in a state in which the flat member is interposed in a vertical direction, the posture of the held material can be held, and various processes, such as carrying of the held member and air cleaning, can be performed. As a result, the carrying and various processes can be performed without directly holding the held member. In addition, when the flat member is held in a vertical direction and the carrying and the various processes are performed, it can be prevented that the held member is sagged downward, and thus comes into contact with the peripheral members.

Preferably, the held member includes a first substrate that has a display region where pixel electrodes and switching elements provided to correspond to the pixel electrodes are formed, a second substrate that is disposed so as to be opposite to the first substrate, and an electro-optical material that is interposed between the first substrate and the second substrate.

Preferably, the flat flexible member is a flat flexible printed circuit that supply image signals to the pixel electrodes.

According to this configuration, even though the flat flexible printed circuit board (FPC) has a specific length, the center portion is curved along a longitudinal direction in a downward direction that is a direction of gravity, and the strength of the FPC can be improved. Accordingly, the electro-optical device that is connected to the front end of the FPC and has the first substrate, the second substrate, and the electro-optical material is not sagged downward due to the gravity applied to the electro-optical device, and the posture of the electro-optical device can be held in a state in which the FPC is supported. Therefore, in a state in which the posture of the electro-optical device is held, various processes, such as carrying of the electro-optical device and air cleaning, can be performed. As a result, the carrying and various processes can be performed without directly holding the electro-optical device. In addition, when the FPC is supported and the carrying and the various processes are performed, it can be prevented that the electro-optical device is sagged downward, and thus comes into contact with the peripheral members.

Preferably, the first member and the second member are integrally formed through a connection member.

According to this configuration, the flat member can be easily interposed by using the first member and the second member.

Preferably, each of the first member and the second member is made of a flat member, the concave portion is formed by cutting a center portion of the flat member in the widthwise direction or disposing protrusion portions protruding upward from the flat member on both ends of the flat member in the widthwise direction, and the convex portion is formed by cutting regions excluding the center portion of the flat member or disposing a protrusion portion protruding downward from the flat member on the center portion of the flat member.

According to this configuration, the concave portion can be easily formed in the first member, and the convex portion can be easily formed in the second member.

Preferably, each of the first member and the second member is made of a rod-shaped member.

Preferably, each of the first member and the second member is made of at least three rod-shaped members that are disposed parallel to one another in the widthwise direction, the concave portion is formed by using a structure in which the rod-shaped member of the center portion in the widthwise direction is disposed at a lower location than the rod-shaped members of both ends in the widthwise direction, and the convex portion is formed by using a structure in which the rod-shaped member of the center portion in the widthwise direction protrudes to a lower location than the rod-shaped members of both ends in the widthwise direction.

According to this configuration, by using the rod-shaped member, the concave portion can be easily formed in the first member and the convex portion can be easily formed in the second member without cutting the portions of the first member and the second member or disposing the protrusion portions in the first member and the second member.

Preferably, thin films that expand and contract by air are formed on surfaces of the first member and the second member that interpose the flat member therebetween, and the concave portion is formed by contracting a center portion of the thin film in the widthwise direction through air sucking, and the convex portion is formed by expanding the center portion of the thin film through air injecting.

According to this configuration, the thin film expands and contracts in a vertical direction, and the concave portion can be easily formed in the first member, and the convex portion can be easily formed in the second member.

Preferably, the electro-optical device supporting device further includes an inversion mechanism that inverts the flat member such that the second member supports the flat member from a lower side of the flat member, in a state in which the flat member is interposed between the first member and the second member.

According to this configuration, the mechanism for inverting the flat member is further provided, and various processes, such as air cleaning, can be easily performed with respect to both surfaces of the held member that is connected to the front end of the flat member.

Preferably, the electro-optical device supporting device further includes a concavo-convex varying mechanism that varies the concave portion of the first member to the concave portion and varies the convex portion of the second member to the concave portion.

According to this configuration, when the flat member is inverted, the concave portion of the first member can be varied to the convex portion, and the convex portion of the second member can be varied to the concave portion. Therefore, the flat member can be surely curved in a downward direction which is a direction of gravity.

Preferably, the rod-shaped member is constructed so as to freely move, and the concavo-convex varying mechanism varies the concave portion of the first member to the convex portion and the convex portion of the second member to the concave portion by moving the rod-shaped portions the center portions of the first member and the second member in a vertical direction.

According to this configuration, the rod-shaped members of the center portions of the first member and the second member in the widthwise direction are moved. As a result, the concave portion of the first member can be easily varied to the convex portion, and the convex portion of the second member can be easily varied to the concave portion.

Preferably, the concavo-convex mechanism varies the concave portion of the first member to the convex portion by expanding the thin film of the center portion of the first member in an upward direction, and varies the convex portion of the second member to the concave portion by contracting the thin film of the center portion of the second member in an upward direction.

According to this configuration, the thin films of the center portions of the first member and the second member in the widthwise direction expand. Therefore, the concave portion of the first member can be easily varied to the convex portion, and the convex portion of the second member can be easily varied to the concave portion.

Preferably, the electro-optical device supporting device further includes a third member that supports the flat member from a lower side at a neighboring portion of the held member, a fourth member that supports the flat member from an upper side at a neighboring portion of the held member, a fifth member that supports the flat member from a lower side at a spaced portion from the held member, and a sixth member that supports the flat member from an upper side at a spaced portion from the held member. Further, the flat member is interposed in a vertical direction by the third member and the fifth member, and the fourth member and the sixth member.

According to this configuration, when the various processes, such as a cleaning process or the like, are performed with respect to the held member, the posture of the held member can be more surely fixed by means of the third member and the fifth member, and the fourth member and the sixth member. Therefore, various processes can be performed without directly holding the held member. When the flat member is held and various processes are performed, it can be prevented that the held material is sagged in a downward direction that is a direction of gravity, and thus comes into contact with peripheral members.

Preferably, the third member and the fourth member are integrally formed through a connection member.

According to this configuration, the flat member can be easily interposed by using the third member and the fourth member.

Preferably, the fifth member and the sixth member are integrally formed through a connection member.

According to this configuration, the flat member can be easily interposed by using the fifth member and the sixth member.

Preferably, the first member and the second member interpose the flat flexible member between the third member and the fifth member, and the fourth member and the sixth member in a vertical direction.

According to this configuration, even in a state in which the flat member is interposed in a vertical direction by the third member and the fifth member, and the fourth member and the sixth member, the flat member can be surely interposed in the vertical direction by the first member and the second member.

Preferably, the flat member is connected to connection terminal portions that are formed in one of the first substrate and the second substrate, and one of the third member and the fourth member at the neighboring portions of the held member cover and support the flat member that are connected to the connection terminal portions.

According to this configuration, one of the third member and the fourth member of the neighboring portions of the held member covers and supports one end of the flat member connected to the connection terminal portion, and thus the connection between the flat member and the held member can be surely protected by one of the third member and the fourth member.

Preferably, supporting surfaces of the third member and the fifth member, and the fourth member and the sixth member that support the flat member are flat.

According to this configuration, the flat member can be surely supported by the flat supporting surfaces of the third member and the fifth member, and the fourth member and the sixth member.

Preferably, the supporting surfaces of the third member and the fourth member are flat, and a concave portion is formed in the supporting surface of the fifth member, and a convex portion is formed in the supporting surface of the sixth member.

According to this configuration, the connection between the flat member and the held member can be surely protected by the flat surface of one of the third member and the fourth member of the neighboring portions of the held member, and the portion spaced apart from the held member can be surely curved along the longitudinal direction in a downward direction that is a direction of gravity through the fitting between the concave portion of the fifth member and the concave portion of the sixth member. Therefore, the held member is not sagged downward due to the gravity applied to the held member, and the posture of the held member can be held in a state in which the flat member is supported.

Preferably, the third member and the fifth member are integrally formed so as to form a seventh member, the fourth member and the sixth member are integrally formed so as to form an eight member, a supporting surface of the seventh member for supporting the flat member is formed of a continuously inclined surface that couples a bottom portion of the concave portion of the fifth member with the flat surface of the third member, and a supporting surface of the eighth member for supporting the flat member is formed of a continuously inclined surface that couples a top portion of the convex portion of the sixth member with the flat surface of the fourth member.

According to this configuration, the connection between the flat member and the held member can be surely protected through the fitting between the continuously inclined surfaces that are formed on the supporting surfaces of the seventh member and the eight member. In addition, the flat member can be surely curved along a longitudinal direction in a downward direction that is a direction of gravity. Therefore, the held member is not sagged downward due to the gravity applied to the held member, and the posture of the held member can be held in a state in which the flat member is supported.

According to another aspect of the invention, there is provided a method of supporting an electro-optical device. The method includes supporting neighboring portions of both ends of a flexile flat member extending from a held member in a widthwise direction from a lower side of the flat member, by means of a first member where a concave portion is formed in a center portion of the first member in the widthwise direction, and interposing a center portion of the flat member in the widthwise direction between the first member and a second member where a convex portion is formed, and pushing down the concave portion by the convex portion so as to push down and deform the flat shape member.

According to this configuration, even though the flat member has a specific length, the flat member is curved along a longitudinal direction in a downward direction that is a direction of gravity, and the strength of the flat member can be improved. Accordingly, the held member that is connected to the front end of the flat member is not sagged downward due to the gravity applied to the held member, and the posture of the held member can be held in a state in which the flat member is supported. Therefore, in a state in which the posture of the held material is held, various processes, such as carrying of the held member and cleaning, can be performed. As a result, the carrying and various processes can be performed without directly holding the held member. In addition, when the flat member is supported and carried, and the various processes are performed, it can be prevented that the held member is sagged downward, and thus comes into contact with the peripheral members.

BRIEF DESCRIPTION OF THE DRAWINGS

The invention will be described with reference to the accompanying drawings, wherein like numbers reference like elements.

FIG. 10A is a cross-sectional view illustrating only a supporting device and a liquid crystal device in a supporting device, an FPC, and a liquid crystal device before inversion.

FIG. 10B is a cross-sectional view illustrating only a supporting device in a supporting device and an FPC before inversion.

FIG. 10C is a perspective view illustrating an inversion device that is provided in a supporting device of FIG. 3.

FIG. 10D is a cross-sectional view illustrating only a supporting device and a liquid crystal device in a supporting device, an FPC, and a liquid crystal device after inversion.

FIG. 10E is a cross-sectional view illustrating only a supporting device in a supporting device and an FPC after inversion.

FIG. 18B is a cross-sectional view in a case in which FIG. 18A is viewed from only a longitudinal direction.

FIG. 21B is a cross-sectional view in a case in which FIG. 21A is viewed from only a longitudinal direction.

DESCRIPTION OF EXEMPLARY EMBODIMENTS

Hereinafter, the preferred embodiments of the invention will be described with reference to the accompanying drawings. In the preferred embodiment that will be described below, as an electro-optical device supported by an electro-optical device supporting device, a liquid crystal device will be exemplified. Therefore, as the electro-optical device supporting device, a liquid crystal device supporting device (hereinafter, simply referred to as supporting device) will be exemplified. That is, in the preferred embodiments that will be described below, as a held member, a liquid crystal device will be exemplified.

Further, in a pair of substrates used in the liquid crystal device, one substrate corresponds to an element substrate (hereinafter, referred to as TFT substrate) that is a first substrate, and the other substrate corresponds to a counter substrate that is a second substrate opposite to the TFT substrate.

First Embodiment

Figure 1:
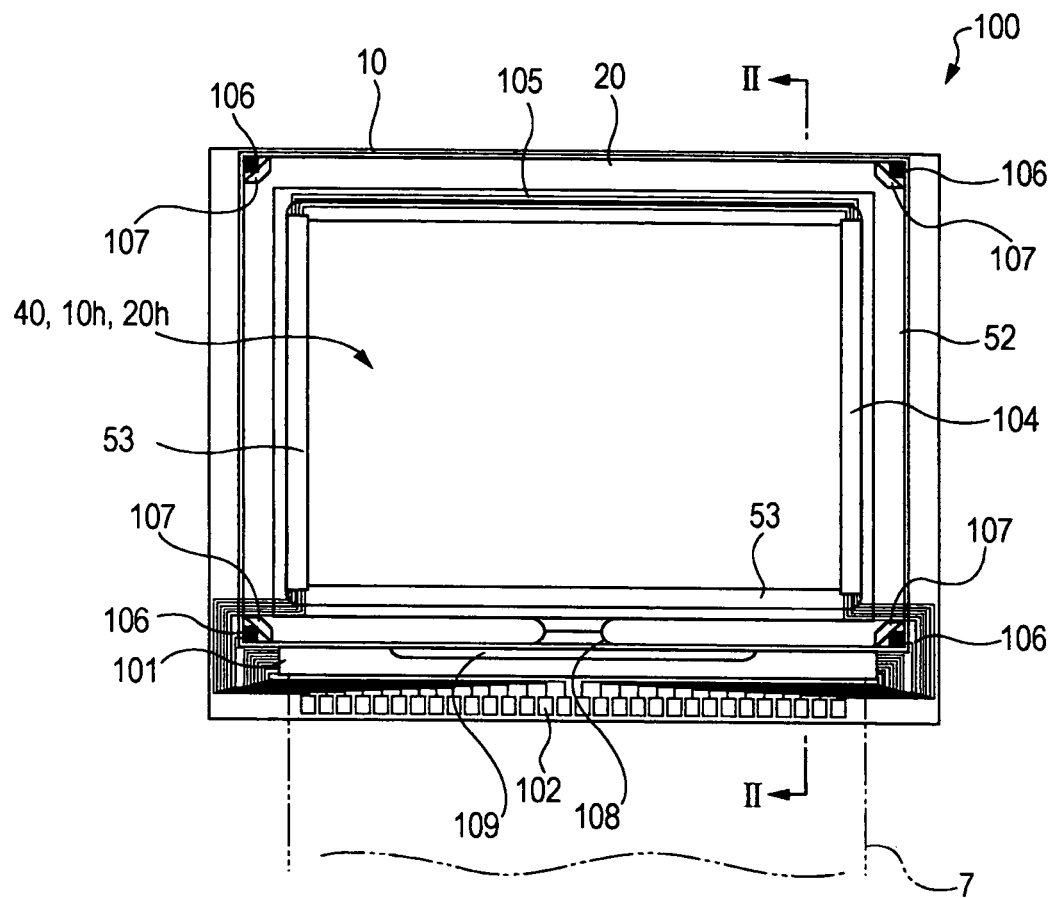
FIG. 1 a plan view illustrating a liquid crystal display supported by a supporting device according to an embodiment of the invention.

First, an entire structure of a liquid crystal device, which is supported by a liquid crystal device supporting device according to the present embodiment, will be described. FIG. 1 is a plan view of a liquid crystal device that is supported by a supporting device according to a first embodiment of the invention, and FIG. 2 is a cross-sectional view taken along the line II-II of FIG. 1.

Figure 2:
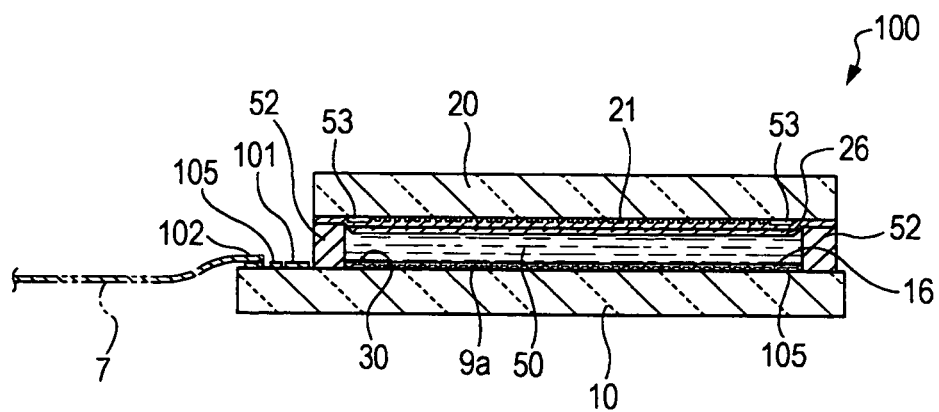
FIG. 2 is a cross-sectional view taken along the line II-II of FIG. 1.

As shown in FIGS. 1 and 2, a liquid crystal device 100 has a structure in which liquid crystal 50 is interposed in an inner space between an element substrate 10 (hereinafter, referred to as TFT substrate) and a counter substrate 20. The element substrate 10 uses, for example, a quartz substrate, a glass substrate, and a silicon substrate, the counter substrate 20 is disposed to be opposite to the TFT substrate 10 and uses, for example, the glass substrate or the quartz substrate, and the liquid crystal 50 is an electro-optical material. The TFT substrate 10 and the counter substrate 20, which are disposed to be opposite to each other, are bonded to each other through a sealant 52.

On a surface of the TFT substrate 10 that comes into contact with the liquid crystal 50 on the TFT substrate 10, a display region 10h of the TFT substrate 10, which forms a display region 40 of the liquid crystal device 100, is constructed. Further, pixel electrodes 9a (ITO) forming pixels and switching elements 30 provided so as to correspond to the pixel electrodes 9a are disposed in a matrix in the display region 10h.

Further, on an entire surface of the counter substrate 20, a counter electrode 21 (ITO) is provided. On a surface of the counter electrode 21 that comes into contact with liquid crystal 50 at a location opposite to the display region 10h of the TFT substrate 10, a display region 20h of the counter substrate 20, which forms the display region 40 of the liquid crystal device 100, is constructed.

A first alignment film 16, which is subjected to a rubbing process, is provided on the pixel electrodes 9a of the TFT substrate 10, and a second alignment film 26, which is subjected to a rubbing process, is provided on the counter electrode 21 that is formed over an entire surface of the counter substrate 20. Each of the alignment films 16 and 26 is made of a transparent organic film, such as, for example, a polyimide film.

On the counter substrate 20, light shielding films 53 are provided. The light shielding film 53 serves as a frame for defining a display region by defining and dividing outer circumferences of the display region 10h of the TFT substrate 10 and the display region 20h of the counter substrate 20 in pixel regions.

When the liquid crystal 50 is injected into a space between the TFT substrate 10 and the counter substrate 20 by using a known method of injecting liquid crystal, a portion of one side of the sealant 52 is notched such that the liquid crystal is injected through the notched portion. A location where the portion of the sealant 52 is notched forms a liquid crystal injecting hole 108 for injecting the liquid crystal between the TFT substrate 10 and the counter substrate 20 through the notched portion. The liquid crystal injecting hole 108 is sealed by a sealing member 109 after the liquid crystal is injected.

In regions outside the sealant 52, a data line driving circuit 101 and external connecting terminals 102 are provided along one side of the TFT substrate 10. The data line driving circuit 101 corresponds a driver that drives data lines (not shown) of the TFT substrate 10 by supplying image signals to the data lines with a predetermined timing, and the external connection terminals 102 correspond to terminals for external circuit connection.

To the external circuit connecting terminal 102, a front end of a flat flexible printed circuit 7 (hereinafter, referred to as FPC) is connected. The FPC 7 corresponds to a flat flexible member with a specific length that electrically connects the liquid crystal device 100 to an electronic apparatus, such as a projector or the like. Further, a base end of the FPC 7 is connected to the electronic apparatus, such as the projector or the like, and the liquid crystal device 100 and the electronic apparatus are electrically connected to each other. Furthermore, the external connecting terminal 102 may be provided in the counter substrate 20.

Further, scanning line driving circuits 103 and 104 are provided along two sides adjacent to one side where the external connecting terminals 102 of the TFT substrate 10 are provided. The scanning line driving circuits 103 and 104 correspond to drives that supply scanning signals to scanning lines and gate electrodes (not shown) of the TFT substrate 10 with a predetermined timing, and drive the gate electrodes. The scanning line driving circuits 103 and 104 are formed on the TFT substrate 10 at a location opposite to the light shielding film 53 inside the sealant 52.

Further, on the TFT substrate 10, wiring lines 105, which connect the data line driving circuit 101, the scanning line driving circuits 103 and 104, the external connecting terminals 102, and upper and lower conductive terminals 107, are provided so as to be opposite to three sides of the light shielding film 53.

The upper and lower conductive terminals 107 are formed on the TFT substrate 10 at four locations of corner portions of the sealant 52. In addition, upper and lower conductive members 106, each of which has a lower end coming into contact with the upper and lower conductive terminal 107 and has an upper end coming into contact with the counter substrate 21, are provided between the TFT substrate 10 and the counter substrate 20. The TFT substrate 10 and the counter substrate 20 are electrically connected to each other by means of the upper and lower conductive members 106.

Next, when the liquid crystal device 100 having the above-mentioned structure is carried so as to connect it to the electronic apparatus, or when various processes, such as air cleaning or the like, are performed on exposed surfaces of the TFT substrate 10 and the counter substrate 20 of the liquid crystal device 100, a supporting device 1 supports the FPC 7 so as to support the posture of the liquid crystal device 100. A structure of the supporting device 1 will be described with reference to FIGS. 3 and 4.

Figure 3:
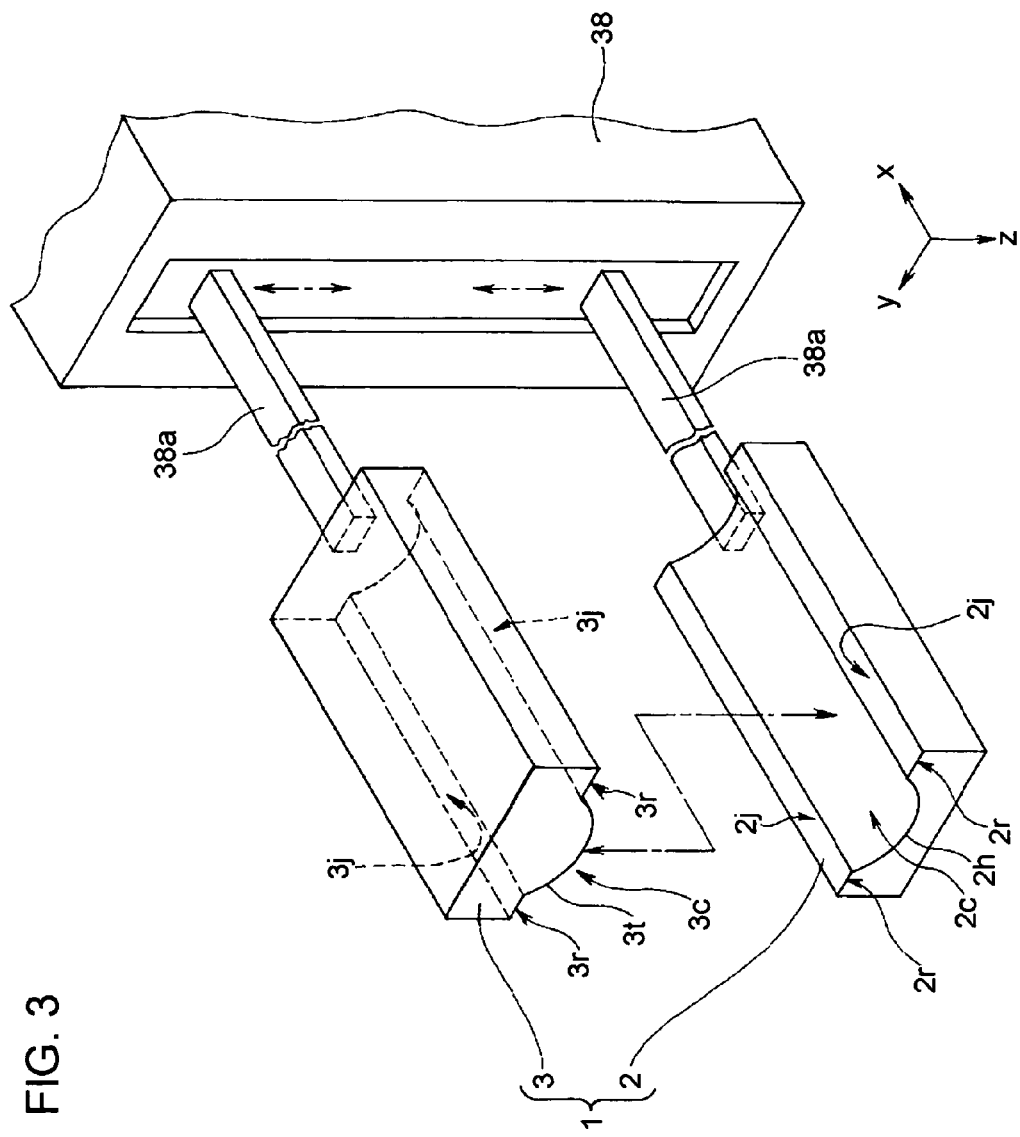
FIG. 3 is a perspective view illustrating a supporting device according to an embodiment of the invention and a driving device for driving the supporting device.
Figure 4:
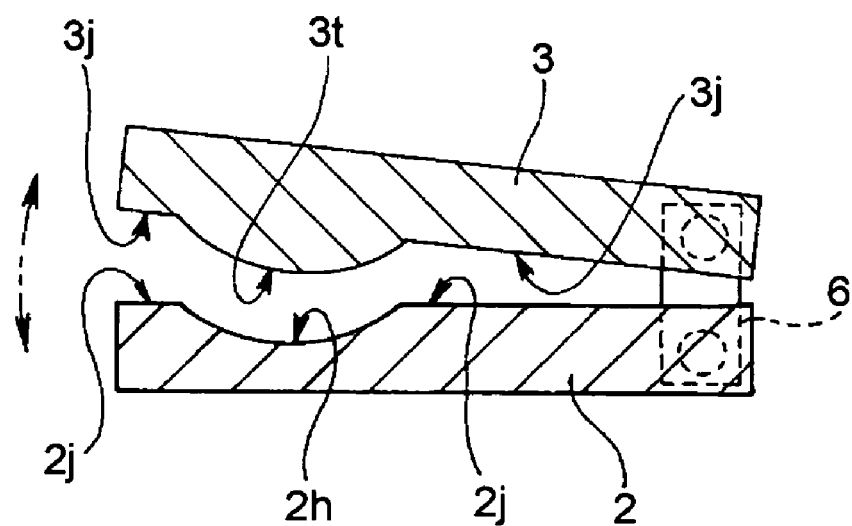
FIG. 4 is a cross-sectional view illustrating a modification where a first member and a second member of a supporting device of FIG. 3 are integrally constructed through a connection member.

FIG. 3 is a perspective view illustrating a supporting device and a driving device for driving the supporting device according to an embodiment of the invention. FIG. 4 is a cross-sectional view illustrating a modification in which a first member and a second member of the supporting device of FIG. 3 are integrally constructed through a connection member.

The supporting device 1 interposes the FPC 7 in a vertical direction. As shown in FIG. 3, the supporting device 1 is constructed by a first member 2 and a second member 3. Further, the first member 2 and the second member 3 are connected to arms 38a that extend from a driving device 38 serving as a driving means, and are movable in a z direction (hereinafter, referred to as heightwise direction) of FIG. 3. The first member 2 and the second member 3 can be freely opened and closed by means of the driving device 38. The first member 2 and the second member 3 are closed, so that the FPC 7 is interposed between the first member 2 and the second member 3.

As shown in FIG. 4, the first member 2 and the second member 3 may not be separated from each other. That is, the first member 2 and second member 3 may be integrally formed through a connection member 6 so as to be freely opened and closed. Even when the first member 2 and the second member 3 are integrally formed through the connection member, the FPC 7 may be easily interposed by the first member 2 and the second member 3.

Each of the first member 2 and the second member 3 is constructed by flat members, each of which is elongated in an x direction (hereinafter, referred to as longitudinal direction) of FIG. 3 and has a predetermined thickness in a z direction (hereinafter, referred to as heightwise direction) of FIG. 3 that is a vertical direction. In FIG. 3, each of the first member 2 and the second member 3 has the same length in a longitudinal direction and the same thickness in a heightwise direction, but may have a different length and a different thickness.

On a top surface of the first member 2 in a heightwise direction (hereinafter, referred to as top surface), a concave portion 2h having a semicircular sectional shape is provided along a longitudinal direction in a center portion 2c of the first member 2 in a y direction (hereinafter, referred to as widthwise direction) of FIG. 3. Further, on the top surface of the first member 2, flat surfaces 2j are formed along a longitudinal direction in neighboring regions 2r of both ends of the first member 2 excluding the concave portion 2h in a widthwise direction.

On a bottom surface of the second member 3 in a heightwise direction (hereinafter, referred to as bottom surface), a convex portion 3t that extends downward in a heightwise direction and has a semicircular sectional shape is formed along a longitudinal direction in a center portion 3c of the second member 3 in a widthwise direction.

The convex portion 3t has a shape that can be freely fitted into the concave portion 2h of the first member 2, when the top surface of the first member 2 and the bottom surface of the second member 3 are closed or opened. Further, the convex portion 3t may be formed by cutting regions of the second member 2 excluding the center portion 3c in a widthwise direction along a longitudinal direction in the bottom surface of the second member 3, or the convex portion 3t that is a protrusion portion may be disposed on the bottom surface along a longitudinal direction by means of a bonding process. That is, the convex portion 3t may be integrally formed with respect to the second member 3 or may be formed so as to be separated from the second member 3.

Further, on the bottom surface of the second member 3, flat surfaces 3j are formed along a longitudinal direction in neighboring regions 3r of both ends of the second member 3 excluding the convex portion 3t in a widthwise direction. Each of the flat surfaces 3j has a shape that comes into contact with each of the flat surfaces 2j of the first member 2, when the top surface of the first member 2 and the bottom surface of the second member 3 are opened and closed.

Figure 5:
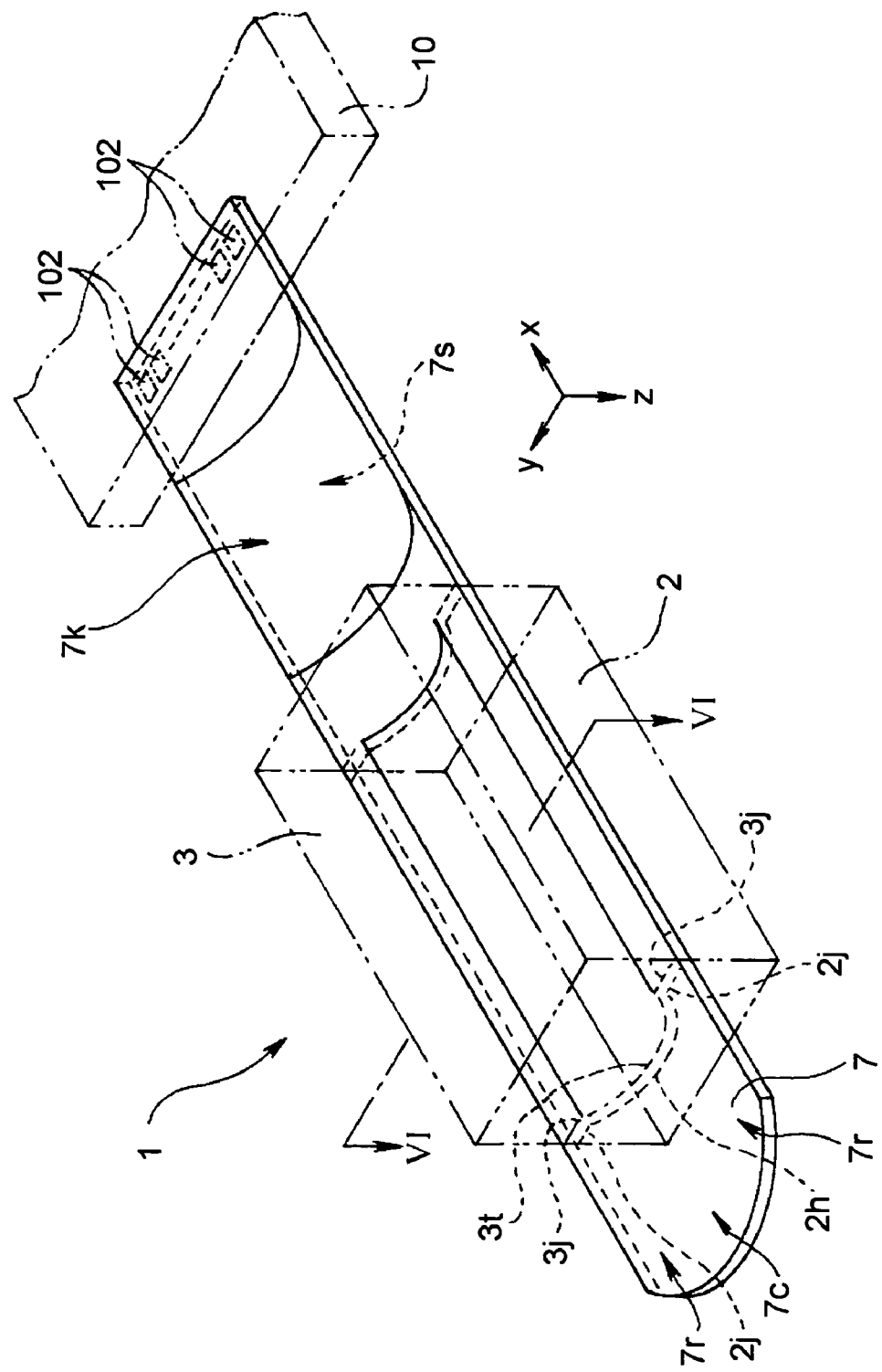
FIG. 5 is a perspective view illustrating a state in which an FPC whose front end is connected to a liquid crystal device is interposed between a first member and a second member of a supporting device of FIG. 3.
Figure 6:
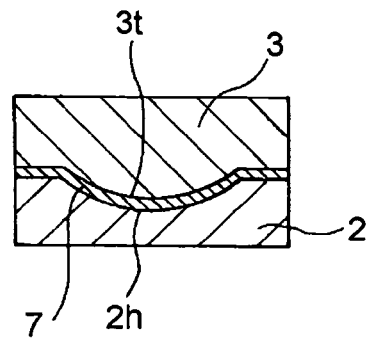
FIG. 6 is a cross-sectional view taken along the line VI-VI of FIG. 5.

Next, the function of the supporting device 1 having the above-mentioned structure will be described with reference to FIGS. 5 and 6. FIG. 5 is a perspective view illustrating a state in which an FPC whose front end is connected to the liquid crystal device is interposed between the first member and the second member of the supporting device of FIG. 3. FIG. 6 is a cross-sectional view taken along the line VI-VI of FIG. 5.

When the liquid crystal device 100 is carried, or various processes are performed on the liquid crystal device 100, or when the posture of the liquid crystal device 100 is held, the FPC 7, whose front end is connected to the external connecting terminal 102 of the TFT substrate 10 of the liquid crystal device 100 and which has a predetermined length, is interposed in a vertical direction by the supporting device 1, as shown in FIGS. 5 and 6. The FPC 7 is interposed between the first member 2 and the second member 3 by using a robot.

Specifically, first, from the lower side of the FPC 7 in a z direction of FIG. 5 (hereinafter, referred to as heightwise direction), flat surfaces 2j of the top surface of the first member 2 come into contact with neighboring portions 7r of both ends of a bottom surface 7s of the FPC 7 in a y direction (hereinafter, referred to as widthwise direction) of FIG. 5 along an x direction (hereinafter, referred to as longitudinal direction) of FIG. 5. Thereby, the neighboring regions 7r of both ends of the bottom surface 7s of the FPC 7 in a widthwise direction are supported by the flat surfaces 2j of the top surface of the first member 2 along a longitudinal direction, from the lower side.

Next, from the upper side of a heightwise direction with respect to the FPC 7, the bottom surface of the second member 3 is closed with respect to the top surface of the first member 2. As a result, the convex portion 3t of the second member 3 is pushed down on the center portion 7c of the surface 7k (hereinafter, referred to as top surface) opposite to the bottom surface 7s of the FPC 7 along a longitudinal direction.

Then, the convex portion 3t of the second member 3 is fitted into the concave portion 2h of the first member 2 in a longitudinal direction with the FPC 7 interposed therebetween, and the flat surfaces 3j of the bottom surface of the second member 3 are fitted into the flat surfaces 2j of the top surface of the first member 2 along a longitudinal direction with the FPC 7 interposed therebetween.

Thereby, the center portion 7c of the FPC 7 in a widthwise direction is pushed down and deformed downward in a heightwise direction with respect to the concave portion 2h along a longitudinal direction. That is, in the FPC 7, only the center portion 7c has a semicircular shape that is curved downward in a heightwise direction.

The center portion 7c is curved downward in the heightwise direction along a longitudinal direction, and thus the strength of the flexible FPC 7 is improved. That is, even though only the FPC 7 is supported by the supporting device 1, the liquid crystal device 100 that is connected to the front end of the FPC 7 is not sagged due to gravity applied to the liquid crystal device 100.

In FIGS. 5 and 6, the lengths of the first member 2 and the second member 3 in the widthwise direction are the same as the length of the FPC 7 in a widthwise direction, but the invention is not limited thereto. That is, the lengths of the first member 2 and the second member 3 in the widthwise direction may be shorter than the length of the FPC 7 in a widthwise direction.

As such, in the present embodiment, by means of the supporting device 1, the center portion 7c of the FPC 7 whose front end is connected to the external connecting terminals 102 in a widthwise direction is curved downward in a heightwise direction along a longitudinal direction, and the strength of the FPC 7 is improved. The posture of the liquid crystal device 100 is held in a state in which the FPC 7 is supported.

By adopting this structure, even though the flexible FPC 7 has a specific length in a longitudinal direction, the liquid crystal device 100 connected to the front end of the FPC 7 is not sagged downward in a heightwise direction due to the gravity applied to the liquid crystal device 100, and the posture of the liquid crystal device 100 can be held in a state in which the FPC 7 is supported. Therefore, in a state in which the posture of the liquid crystal device 100 is held, the liquid crystal device 100 can be carried, and various processes, such as air cleaning or the like, can be performed.

As a result, the carrying of the liquid crystal device and the various processes can be performed without directly holding the liquid crystal device 100. In addition, when the carrying of the liquid crystal device and the various processes are performed in a state in which the FPC 7 is supported, it can be prevented that the liquid crystal device 100 is sagged downward, and thus comes into contact with neighboring members.

Figure 7:
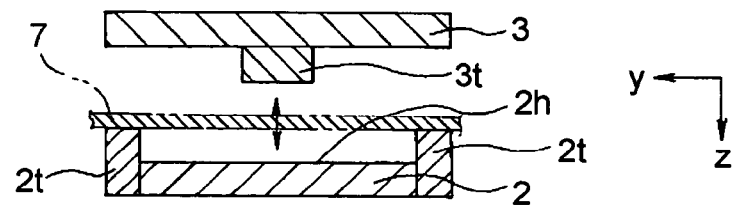
FIG. 7 is a cross-sectional view illustrating a supporting device according to a modification of shapes of a first member and a second member shown in FIG. 3.

Hereinafter, a modification will be described. FIG. 7 is a cross-sectional view illustrating a supporting device according to a modification of shapes of the first member and the second member shown in FIG. 3.

In the present embodiment, the concave portion 2h of the first member 2 and the convex portion 3t of the second member 3 have semicircular sectional shapes. However, the invention is not limited thereto. If the convex portion 3t of the second member 3 can be fitted into the concave portion 2h of the first member 2, the concave portion 2h and the convex portion 3t may have rectangular sectional shapes, as shown in FIG. 7. That is, if the convex portion of the second member can be fitted into the concave portion of the first member, the shapes of the concave portion and the convex portion are not limited.

In the present embodiment, the concave portion 2h is formed by cutting a portion of the center portion 2c of the top surface of the first member 2. However, the invention is not limited thereto. As shown in FIG. 7, protrusion portions 2t may be disposed on both ends of the first member 2 in a widthwise direction by means of a bonding process, the top surface of the first member 2 may be made to be lower than the top surfaces of the protrusion portions 2t, and the concave portion 2h may be formed. According to this structure, the concave portion 2h may be easily formed in the first member 2, as compared with the case in which the concave portion 2h is formed by cutting the center portion. Even when the first member 2 and the second member 3 have the above-mentioned structure, it is possible to achieve the same effects as the present embodiment.

Figure 8:
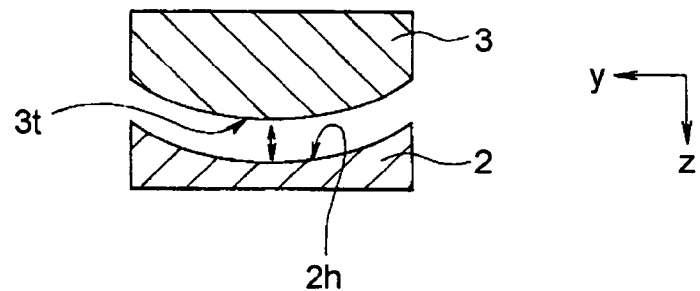
FIG. 8 is a cross-sectional view illustrating a supporting device according to another modification of shapes of a first member and a second member shown in FIG. 3.

Hereinafter, another modification will be described. FIG. 8 is a cross-sectional view of a supporting device according to another modification of the shapes of the first member and the second member shown in FIG. 3.

In the present embodiment, as shown in FIG. 3, the concave portion 2h is formed by cutting the center portion 2c of the top surface of the first member 2 in a widthwise direction along a longitudinal direction. Further, the convex portion 3t is formed by cutting the regions of the bottom surface of the second member 3 excluding the center portion 3c in a widthwise direction along a longitudinal direction or disposing the protrusion portion on the center portion 3c of the bottom surface along a longitudinal direction.

However, the invention is not limited thereto. As shown in FIG. 8, the concave portion 2h may be formed on the entire top surface of the first member 2 in a widthwise direction, and the convex portion 3t may also be formed on the entire bottom surface of the second member 3. That is, the first member 2 may be formed of a concave member whose entire sectional shape is a concave shape, for example, a semicircular shape, and the second member 3 may be formed of a convex member whose entire sectional shape is a convex shape, for example, a semicircular shape.

According to this structure, the concave portion 2h may be easily formed in the first member 2, and the convex portion 3t may be easily formed in the second member 3. Further, even when these structures of the first member 2 and the second member 3 are adopted, it is possible to achieve the same effects as the present embodiment.

Figure 9:
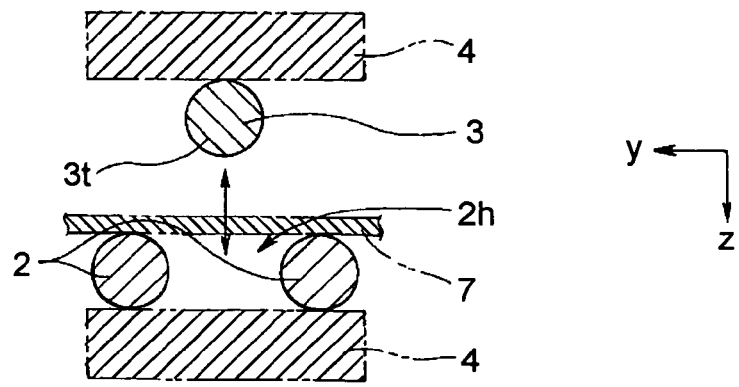
FIG. 9 is a cross-sectional view illustrating a supporting device according to another modification of shapes of a first member and a second member shown in FIG. 3.

Hereinafter, another modification will be described. FIG. 9 is a cross-sectional view of a supporting device illustrating a modification according to another modification of the shapes of the first member and the second member shown in FIG. 3.

In the present embodiment, each of the first member 2 and the second member 3 is made of a flat member. However, the invention is not limited thereto. That is, each of the first member 2 and the second member 3 may be formed of a rod-shaped member having a circular sectional shape. Further, the sectional shape of the rod-shaped member is not limited to the circular shape.

Specifically, as shown in FIG. 9, the first member 2 is formed of two rod-shaped members that are disposed in a widthwise direction at a predetermined gap, and have predetermined lengths in a longitudinal direction, and the second member 3 is formed of one rod-shaped member that has a predetermined length in a longitudinal direction. The second member 3 is freely fitted into a predetermined gap of the first member 2 in a widthwise direction. In this case, the concave portion 2h is formed in the predetermined gap of the two rod-shaped members in a widthwise direction, and the convex portion 3t is constructed by the second member 3 itself.

Even when the structures of the first member 2 and the second member 3 are adopted, it is possible to achieve the same effects as the present embodiment. Further, in this case, the first member 2 and the second member 3 having the rod shapes may be disposed on the flat members 4, as shown in FIG. 9.

Hereinafter, another modification will be described. FIG. 10A is a cross-sectional view illustrating only a supporting device and a liquid crystal device in the supporting device, an FPC, and the liquid crystal device before inversion. FIG. 10B is a cross-sectional view illustrating only the supporting device in the supporting device and the FPC before inversion. FIG. 10C is a perspective view illustrating an inversion device that is provided in a supporting device of FIG. 3. FIG. 10D is a cross-sectional view illustrating only the supporting device and the liquid crystal device in the supporting device, the FPC, and the liquid crystal device after inversion. FIG. 10E is a cross-sectional view illustrating only the supporting device in the supporting device and the FPC after inversion.

As shown in FIG. 10C, the supporting device 1 is inverted at an angle of 180°. For example, an inversion mechanism 18, which is constructed by an arm 18a of a robot and a control unit 18b for moving the arm 18a in a widthwise direction so as to rotate, may be provided in the supporting device 1.

As such, if the inversion mechanism 18 is provided in the supporting device 1, various processes can be performed on exposed surfaces of both surfaces of the liquid crystal device 100 rather than one surface of the liquid crystal device 100, in a state in which the posture of the liquid crystal device 100 to be connected to the front end of the FPC 7 is held by the supporting device 1.

Specifically, first, as shown in FIGS. 10A and 10B, the FPC 7 is interposed in a vertical direction by the supporting device 1, and the center portion 7c of the FPC 7 is curved downward in a heightwise direction and the FPC 7 has strength. In this state, as shown in FIG. 10A, an air blowing device 17 blows air A on the exposed surface 10r of the TFT substrate 10 of the liquid crystal device 100, which results in removing dusts adhered to the exposed surface 10r of the TFT substrate 10.

Then, by using the above-mentioned inversion mechanism 18, the first member 2 and the second member 3 are held by the arm 18a. In this state, as shown in FIGS. 10D and 10E, the supporting device 1 is inverted at an angle of 180°. Thereby, the FPC 7 supported by the supporting device 1 is inverted at an angle of 180°. As a result, the liquid crystal device 100 that is connected to the front end of the FPC 7 is inverted at an angle of 180°.

Finally, in the inverted liquid crystal device 100, as shown in FIG. 10D, the air blowing device 17 blows the air A on the exposed surface 20r of the counter substrate 20, which results in removing dusts adhered to the exposed surface 20r of the counter substrate 20.

As such, if the inversion mechanism 18 is provided in the supporting device 1, various processes, such as an air cleaning process, may be easily performed with respect to both surfaces that become exposed surfaces of the liquid crystal device 100 that is connected to the front end of the FPC 7.

Meanwhile, if the supporting device 1, the FPC 7, and the liquid crystal device 100 are inverted at an angle of 180° from the state shown in FIG. 10A to the state shown in FIG. 10D by means of the inversion mechanism 18, the center portion 7c of the FPC 7 may be curved upward in a heightwise direction, and thus the strength may be removed in the flexible FPC 7. As a result, the liquid crystal device 100 may be sagged downward in a heightwise direction, due to the gravity applied to the liquid crystal device 100. In order to resolve this problem, the structures of the first member 2 and the second member 3 are as follows.

Figure 11:
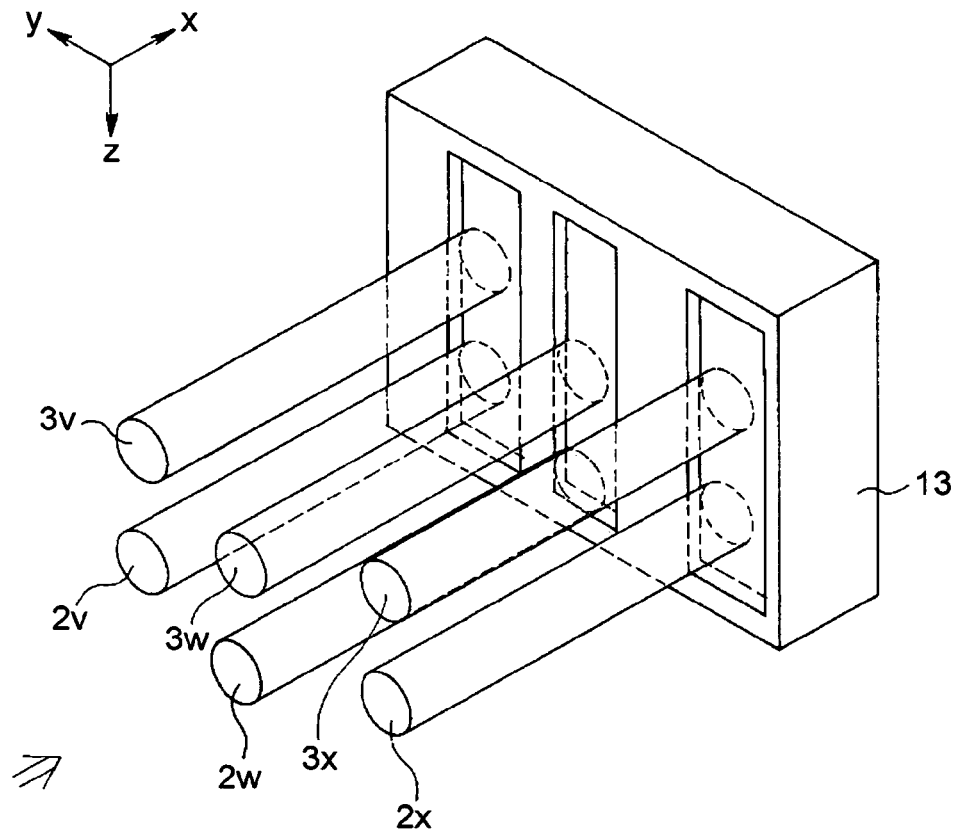
FIG. 11 is a perspective view illustrating a supporting device that has a mechanism for varying a concave portion of a first member shown in FIG. 3 to a convex portion and varying a convex portion of a second member to a concave portion.
Figure 12:
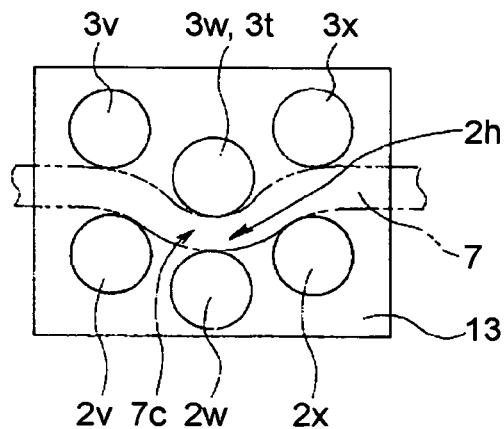
FIG. 12 is a front view of a supporting device illustrating a state in which by means of a rod-shaped member of a supporting device of FIG. 11, a concave portion is formed in a first member and a convex portion is formed in a second member.
Figure 13:
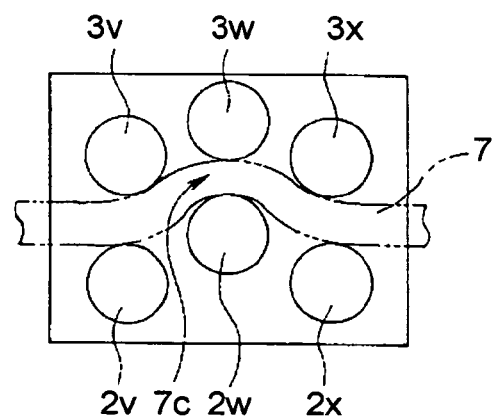
FIG. 13 is a front view of a supporting device illustrating a state in which by means of a rod-shaped member of a supporting device of FIG. 11, a convex portion is formed in a first member and a concave portion is formed in a second member.

FIG. 11 is a perspective view illustrating a supporting device that has a mechanism for varying a concave portion of the first member shown in FIG. 3 to a convex portion and varying a convex portion of the second member to a concave portion. FIG. 12 is a front view of a supporting device in a state in which by means of a rod-shaped member of a supporting device of FIG. 11, a concave portion is formed in a first member and a convex portion is formed in a second member. FIG. 13 is a front view of a supporting device in a state in which by means of a rod-shaped member of a supporting device of FIG. 11, a convex portion is formed in a first member and a concave portion is formed in a second member.

As shown in FIG. 11, a first member 2 has a base end that is fixed to a base portion 13 to be free moved. The first member 2 has three rod-shaped members 2v, 2w, and 2x that are disposed in parallel to one another at predetermined gaps in a widthwise direction. Further, a varying mechanism 19 for moving the rod-shaped member 2w in a heightwise direction is connected to the rod-shaped member 2w of the center portion 2c in a widthwise direction. Further, the varying mechanism 19 may be connected to the rod-shaped members 2v and 2x.

After the FPC 7 is interposed between the first member 2 and the second member 3, when the first member 2 supports the bottom surface 7s of the FPC 7, the varying mechanism 19 moves the rod-shaped member 2w to a location lower than the rod-shaped members 2v and 2x in a heightwise direction, as shown in FIG. 12. Thereby, the concave portion 2h is formed between the rod-shaped members 2v and 2x.

The second member 3 has a base end that is fixed to a base portion 13 to be freely moved. The first member 2 has three rod-shaped members 3v, 3w, and 3x that are disposed in parallel to one another at predetermined gaps in a widthwise direction. Further, a varying mechanism 19 for moving the rod-shaped member 3w in a heightwise direction is connected to the rod-shaped member 3w of the center portion 3c in a widthwise direction. Further, the varying mechanism 19 may be connected to the rod-shaped members 3v and 3x.

When the second member 3 pushes down the top surface 7k of the FPC 7, the varying mechanism 19 moves the rod-shaped member 3w of the center portion in the widthwise direction so as to protrude downward to a lower location than the rod-shaped members 3v and 3x, as shown in FIG. 12. That is, in this case, the rod-shaped member 3w forms the convex portion 3t.

Thereby, when the FPC 7 is interposed between the first member 2 and the second member 3, the center portion 7c of the FPC 7 is curved downward in a heightwise direction by means of the concave portion 2h formed by the rod-shaped member 2w and the convex portion 3t constructed by the rod-shaped member 3w. In this state, the posture of the liquid crystal device 100 before inversion shown in FIG. 10A is held.

Then, from the state shown in FIG. 10A, as shown in FIG. 10D, when the supporting device 1, the FPC 7, and the liquid crystal device 100 are inverted at an angle of 180° by means of the inversion mechanism 18 of FIG. 10, the varying mechanism 19 moves the rod-shaped member 2w of the center portion 2r in a widthwise direction so as to protrude to a higher location (lower location after inversion) than the rod-shaped members 2v and 2x in a heightwise direction, as shown in FIG. 13. In this case, after the rod-shaped member 2w is inverted at an angle of 180°, it forms a convex portion that protrudes downward in a heightwise direction.

Further, as shown in FIG. 13, the varying mechanism 19 moves the rod-shaped member 3w of the center portion in a widthwise direction so as to protrude to a higher location (lower location after inversion) than the rod-shaped members 3v and 3x in a heightwise direction. In this case, after the rod-shaped member 3w is inverted at an angle of 180°, the concave portion is formed between the rod-shaped members 3v and 3x.

Accordingly, after the FPC 7 is inverted at an angle of 180°, in the center portion 7c of the FPC 7, the force curved downward in a heightwise direction is generated by the concave portion by the rod-shaped member 3w and the convex portion formed by the rod-shaped member 2w. In this state, the posture of the liquid crystal device 100 after inversion shown in FIG. 10D is held.

As described above, the varying mechanism 19 constructs a concavo-convex varying mechanism that varies the concave portion of the first member 2 to the convex portion and varies the convex portion of the second member 3 to the concave portion in the present embodiment.

As such, if the varying mechanism 19 that can freely move in a heightwise direction is connected to the rod-shaped members 2w and 3w of the center portions 2c and 3c of the first member 2 and the second member 3 in a widthwise direction, as shown in FIG. 10, even though the inversion mechanism 18 is provided in the supporting device 1, the liquid crystal device 100 held by the FPC 7 after the inversion is not sagged downward in a heightwise direction.

Further, in addition to the variation of the concave portion and the convex portion, the concave portion and the convex portion can be easily formed in the center portions 2c and 3c of the first member 2 and the second member 3 in a widthwise direction by the movement of the rod-shaped member. Therefore, the concave portion and the convex portion can be easily formed in the first member 2 and the second member 3, respectively.

Then, another mechanism that varies the concave portion of the first member to the convex portion and varies the convex portion of the second member to the concave portion will be described with reference to FIGS. 14 to 16.

Figure 14:
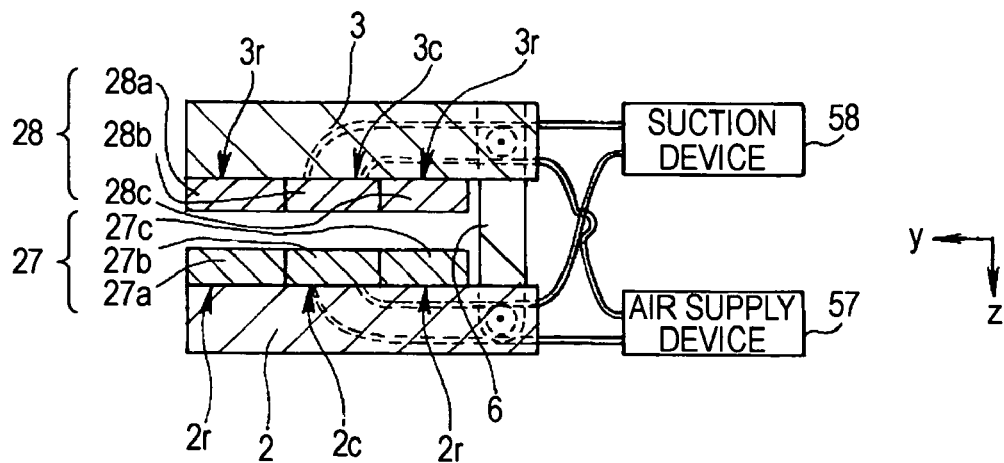
FIG. 14 is a cross-sectional view of a supporting device according to a modification where thin films are formed on a top surface of a first member and a bottom surface of a second member of FIG. 3.

FIG. 14 is a cross-sectional view of a supporting device according to a modification where thin films are formed on a top surface of a first member and a bottom surface of a second member of FIG. 3. FIG. 15 is a cross-sectional view of a supporting device illustrating a state in which air is sucked from a thin film of a center portion of a first member of FIG. 14 and air is injected into a thin film of a center portion of a second member of FIG. 14. FIG. 16 is a cross-sectional view of a supporting device illustrating a state in which air is injected into a thin film of a center portion of a first member of FIG. 14 and air is sucked from a thin film of a center portion of a second member.

As shown in FIG. 14, a first thin film 27 that expands and contracts by air is formed on a top surface of a first member 2, and a second thin film 28 that expands and contracts by air is formed on a bottom surface of a second member 3.

Further, an air supply device 57 and a suction device 58 are respectively connected to a first thin film 27b on the center portion 2c of the first member 2 in a widthwise direction and a first thin film 28b on a center portion 3c of the second member 3 in a widthwise direction.

Figure 15:
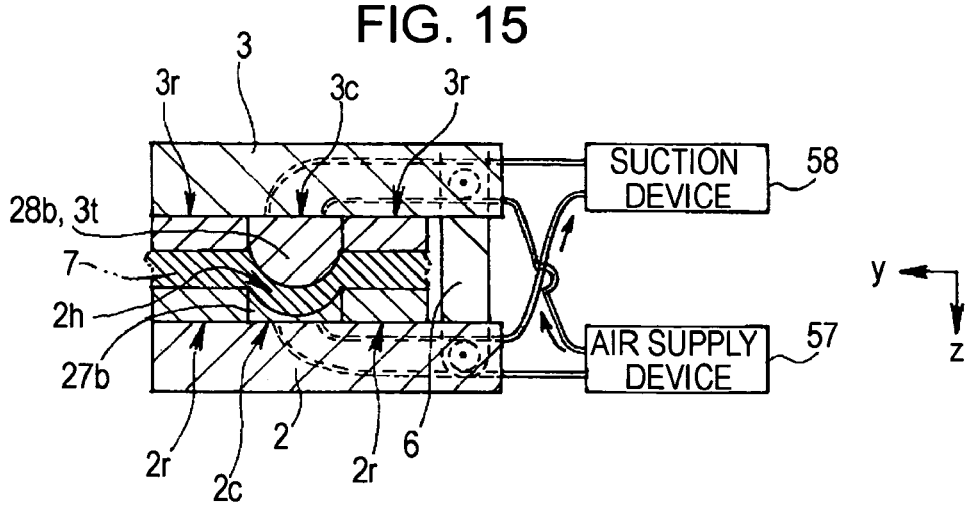
FIG. 15 is a cross-sectional view of a supporting device illustrating a state in which air is sucked from a thin film of a center portion of a first member shown in FIG. 14, and air is injected into a thin film of a center portion of a second member shown in FIG. 14.

After the FPC 7 is interposed between the first member 2 and the second member 3, when the first member 2 supports the bottom surface 7s of the FPC 7, air is sucked from the first thin film 27b by the suction device 58, as shown in FIG. 15. Thereby, the first thin film 27b contracts downward in a heightwise direction. As a result, the first thin film 27b forms the concave portion 2h.

Further, air is injected into the second thin film 28b by means of the air supply device 57. Thereby, the second thin film 28b expands downward in a heightwise direction. As a result, the second thin film 28b forms the convex portion 3t.

Thereby, the center portion 7c of the FPC 7 is curved downward in a heightwise direction. In this state, the posture of the liquid crystal device 100 before inversion shown in FIG. 10A is held.

Figure 16:
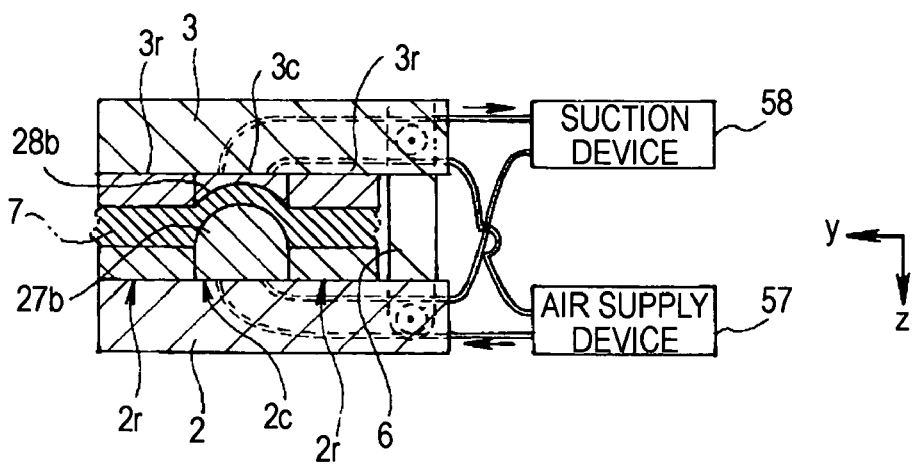
FIG. 16 is a cross-sectional view of a supporting device illustrating a state in which air is injected into a thin film of a center portion of a first member shown in FIG. 14 is sucked and air is sucked from a thin film of a center portion of a second member shown in FIG. 14.

From the state shown in FIG. 10A, as shown in FIG. 10D, when the supporting device 1, the FPC 7, and the liquid crystal device 100 are inverted at an angle of 180° by using the inversion mechanism 18 shown in FIG. 10, the suction device 58 sucks air from the second thin film 28b, as shown in FIG. 16. Thereby, the second thin film 28b contracts upward (downward after inversion) in a heightwise direction. As a result, the second thin film 28b forms a concave portion.

Further, the air supply device 57 injects air into the first thin film 27b. Thereby, the first thin film 27b expands upward (downward after inversion) in a heightwise direction. As a result, the first thin film 27b forms a convex portion.

Accordingly, after the FPC 7 is inverted at an angle of 180°, in the center portion 7c of the FPC 7, the force curved downward in a heightwise direction is generated. In this state, the posture of the liquid crystal device 100 after inversion shown in FIG. 10D is held.

As described above, the air supply device 57 and the suction device 58 construct a concavo-convex varying mechanism that varies the concave portion of the first member 2 to the convex portion and varies the convex portion of the second member 3 to the concave portion in the present embodiment.

As such, if the structures of the first member 2 and the second member 3 are used, in addition to the variation of the concave portion and the convex portion, by the expansion and contraction of the thin films 27 and 28, the concave portion 2h may be easily formed in the first member 2, and the convex portion 3t may be easily formed in the second member 3.

Second Embodiment

Figure 17:
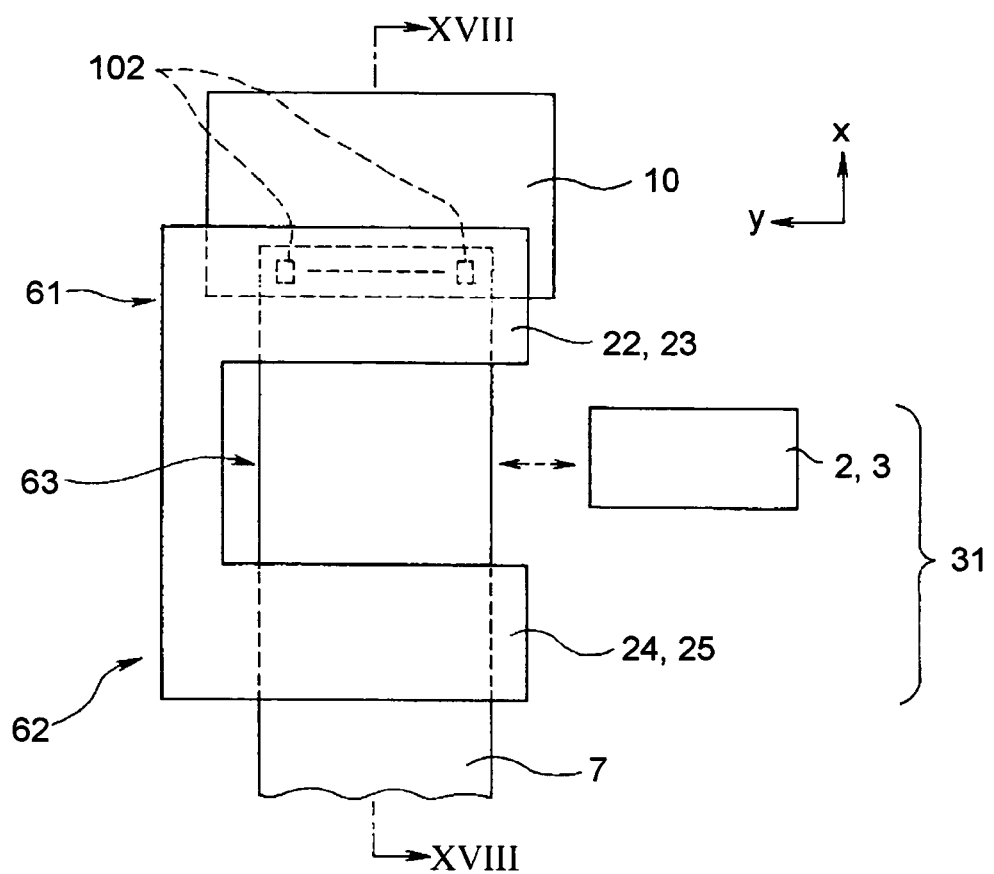
FIG. 17 is a plan view illustrating a supporting device according to another embodiment of the invention.
Figure 18A:
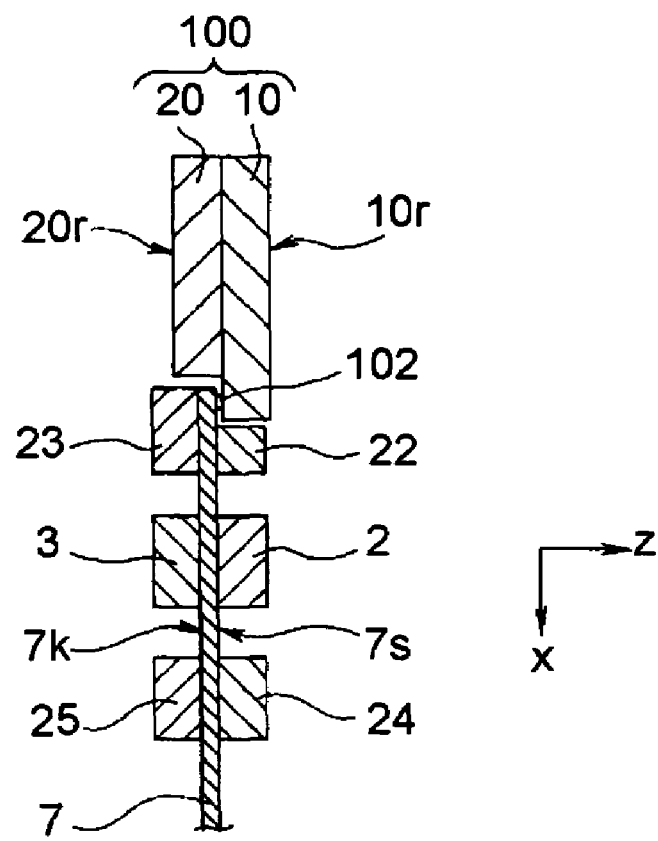
FIG. 18A is a cross-sectional view taken along the line XVIIIA-XVIIA in a state in which an FPC of FIG. 17 is interposed by a first member and a second member in addition to a third member and a fifth member, and a fourth member and a sixth member.
Figure 18B:
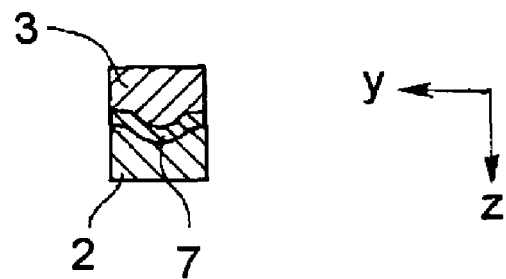
Figure 19:
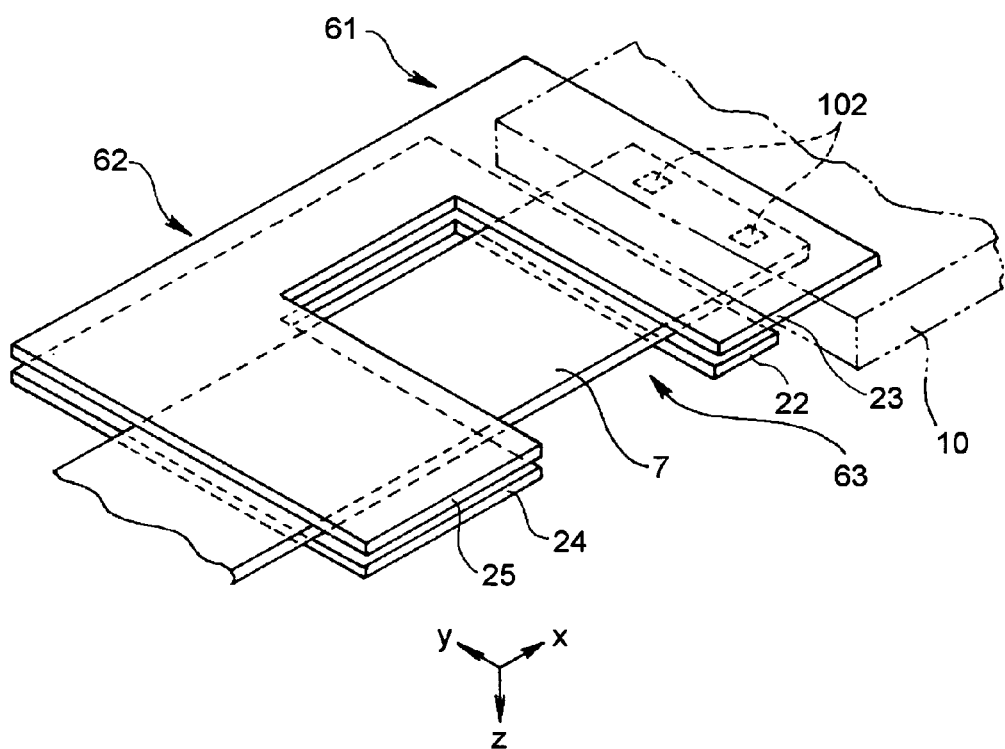
FIG. 19 is an enlarged perspective view of a third member and a fifth member, and a fourth member and a sixth member of FIG. 17.
Figure 20:
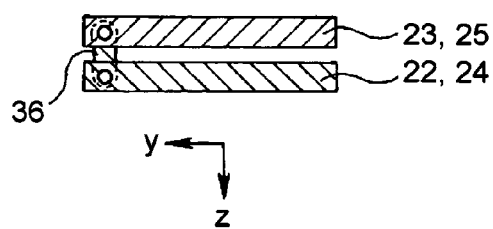
FIG. 20 is a cross-sectional view illustrating a modification in which third and fourth members of FIG. 19 or fifth and sixth members are integrally constructed through a connection member.

FIG. 17 is a plan view illustrating a supporting device according to another embodiment of the invention. FIG. 18A is a cross-sectional view taken along the line XVIIIA-XVIIA in a state in which an FPC of FIG. 17 is interposed by a first member and a second member in addition to a third member and a fifth member, and a fourth member and a sixth member. FIG. 18B is a cross-sectional view in a case in which FIG. 18A is viewed from only a longitudinal direction. FIG. 19 is an enlarged perspective view of a third member and a fifth member, and a fourth member and a sixth member of FIG. 17. FIG. 20 is a cross-sectional view illustrating a modification in which third and fourth members of FIG. 19 or fifth and sixth members are integrally constructed through a connection member.

The second embodiment is different from the first embodiment in that a supporting device for supporting an FPC 17 is constructed by a third member, a fifth member, a fourth member, and a sixth member interposing the FPC 17 in a vertical direction in different regions from a first member and a second member, in addition to the first member 2 and the second member 3. Accordingly, only the difference between the first embodiment and the second embodiment will be described. In addition, in the second embodiment, the same constituent elements as those in the first embodiment will be denoted by the same reference numerals, and the description thereof will be omitted.

As shown in FIG. 17, the supporting device 31 supports the FPC 7, and a main portion of the supporting device 31 is constructed by not only the first member 2 and the second member 3 but also the third member 22, the fourth member 23, the fifth member 24, and the sixth member 25.

As shown in FIG. 19, the third member 22 and the fourth member 23 are constructed such that they are freely opened and closed in a z direction (hereinafter, referred to as heightwise direction) of FIG. 19. The third member 22 and the fourth member 23 are closed, so that the FPC 7 is interposed between the third member and the fourth member.

As shown in FIG. 20, the third member 22 and the fourth member 23 are not separated from each other, but may be integrally formed through a connection member 36 so as to be freely opened and closed. If the third member 22 and the fourth member 23 are integrally formed, the FPC 7 may be easily interposed by using the third member 22 and the fourth member 23.

Further, as shown in FIG. 19, the fifth member 24 and the sixth member 25 are also constructed such that they are freely opened and closed in a heightwise direction. The fifth member 24 and the sixth member 25 are closed, so that the FPC 7 is interposed between the fifth member and the sixth member.

As shown in FIG. 20, the fifth member 24 and the sixth member 25 are not separated from each other, but may be integrally formed through a connection member 36 so as to be freely opened and closed. If the fifth member 24 and the sixth member 25 are integrally formed, the FPC 7 may be easily interposed by using the fifth member 24 and the sixth member 25.

Each of the third member 22 and the fourth member 23 interpose the FPC 7 of the neighboring portion 61 of the liquid crystal device 100 in an x direction (hereinafter, referred to as longitudinal direction) of FIG. 19. Each of the third member 22 and the fourth member 23 is constructed by using a flat member that has a predetermined thickness in a heightwise direction of FIG. 19 that is a vertical direction. In FIG. 19, each of the third member 22 and the fourth member 23 has the same thickness in a heightwise direction, but may have the different thickness.

Each of the fifth member 24 and the sixth member 25 interpose the FPC 7 of the spaced portion 62 of the liquid crystal device 100 in a longitudinal direction of FIG. 19. Each of the fifth member 24 and the sixth member 25 is constructed by using a flat member that has a predetermined thickness in a heightwise direction. In FIG. 19, each of the fifth member 24 and the sixth member 25 has the same thickness in a heightwise direction, but may have the different thickness.

The supporting surface (hereinafter, referred to as top surface) of each of the third member 22 and the fifth member 24 at an upper side of a heightwise direction is flat. Further, the supporting surface (hereinafter, referred to as bottom surface) of each of the fourth member 23 and the fifth member 24 at a lower side of a heightwise direction that is a direction of gravity applied to the fourth member 23 and the fifth member 24 is flat.

When the FPC 7 is interposed by the third member 22 and the fourth member 23, the third member 22 supports the bottom surface 7s of the FPC 7 by at least the flat surface formed on the top surface of the neighboring portion 61 of the liquid crystal device 100. When the FPC 7 is interposed by the fifth member 24 and the sixth member 25, the fifth member 24 supports the bottom surface 7s of the FPC 7 by at least the flat surface formed on the top surface of the spaced portion 62 of the liquid crystal device 100.

When the FPC 7 is interposed by the third member 22 and the fourth member 23, the fourth member 23 supports the top surface 7k of the FPC 7 by at least the flat surface formed on the bottom surface of the neighboring portion 61 of the liquid crystal device 100. When the FPC 7 is interposed by the fifth member 24 and the sixth member 25, the sixth member 25 supports the top surface 7k of the FPC 7 by at least the flat surface formed on the bottom surface of the spaced portion 62 of the liquid crystal device 100. Further, the third member 22 and the fifth member 24 or the fourth member 23 and the sixth member 25 are connected to each other in a longitudinal direction, but may be separated from each other.

The flat surface of the neighboring portion 61 of the fourth member 23 supports, that is, covers a front end of the top surface 7k of the FPC 7 whose front end is fixed to the external connecting terminals 102, and thus protects the connection between the front end of the FPC 7 and the external connecting terminals 102.

In a state in which the FPC 7 is interposed by the third member 22 and the fifth member 24, and the fourth member 23 and the sixth member 25, a space is formed in a longitudinal region 63 between the neighboring portion 61 of the third member 22 and the fourth member 23 and the spaced portion 62 of the fifth member 24 and the sixth member 25. Accordingly, when the FPC 7 is interposed between the third member 22 and the fifth member 24, and the fourth member 23 and the sixth member 25, the top surface 7k and the bottom surface 7s of the FPC 7 are exposed to the outside in a region 63.

In the region 63 exposed to the outside, as shown in FIGS. 17, 18A, and 18B, the first member 2 and the second member 3 can be opened and closed with respect to the FPC 7, that is, interpose the FPC 7 in a vertical direction.

Next, the function of the supporting device according to the second embodiment that has the above-mentioned structure will be described.

First, at least the neighboring portion 61 and the spaced portion 62 of the FPC 7 with respect to the liquid crystal device 100 are interposed in a vertical direction by the third member 22 and the fifth member 24, and the fourth member 23 and the sixth member 25. Then, air is blown on the exposed surface 20r of the counter substrate 20, so that a cleaning process is performed. Further, the interposing of the FPC 7 by the third member 22 and the fifth member 24, and the fourth member 23 and the sixth member 25 is performed by, for example, a robot or the like.

At this time, the third member 22 and the fifth member 24, and the fourth member 23 and the sixth member 25 interpose the top surface 7k and the bottom surface 7s of the neighboring portion 61 and the spaced portion 62 of the FPC 7. The flat surface of the neighboring portion 61 of the fourth member 23 supports the TFT substrate 10 together with the external connecting terminal 102.

Accordingly, during the process, the liquid crystal device 100 is not sagged downward in a heightwise direction that is a direction of gravity, and the connection between the external connecting terminal 102 and the front end of the FPC 7 is protected by the supporting of the flat surface of the neighboring portion 61 of the fourth member 23.

Next, in the region 63 of the FPC 7 exposed to the outside, as shown in FIG. 18, the FPC 7 is interposed in a vertical direction by the first member 2 and the second member 3 so as to be curved downward in a heightwise direction. Then, the third member 22 and the fifth member 24, and the fourth member 23 and the sixth member 25 are closed. That is, the interposing of the FPC 7 by the third member 22 and the fifth member 24, and the fourth member 23 and the sixth member 25 is released.

Thereby, the FPC 7 is interposed between the first member 2 and the second member 3, and it is supported by the first member 2 and the second member 3. In this state, as in the first embodiment, since the FPC 7 is curved downward in a heightwise direction, the liquid crystal device 100 that is connected to the front end of the FPC 7 is not sagged downward in a heightwise direction.

Next, the supporting device 1, which is constructed by the first member 2 and the second member 3, is inverted by means of the above-mentioned inversion mechanism (see FIG. 10). At this time, the FPC 7 and the liquid crystal device 100 are also inverted. Then, the FPC 7 is interposed again by the third member 22 and the fifth member 24, and the fourth member 23 and the sixth member 25. Then, the interposing of the FPC 7 by the first member 2 and the second member 3 is released.

Finally, in a state in which the FPC 7 is interposed by the third member 22 and the fifth member 24, and the fourth member 23 and the sixth member 25, air is blown on the exposed surface 10r of the TFT substrate 10 of the liquid crystal device 100 after inversion, and thus the exposed surface 10r is subjected to a cleaning process.

As such, in the present embodiment, when various processes are performed on the liquid crystal device 100, the neighboring portion 61 and the spaced portion 62 of the liquid crystal device 100 of the FPC 7 whose front end is connected to the liquid crystal device 100 are interposed in a vertical direction by the flat surfaces formed by the third member 22 and the fifth member 24, and the fourth member 23 and the sixth member 25.

Further, when the liquid crystal device 100 and the FPC 7 are inverted, the portion of the FPC 7 exposed to the outside in the region 63 is interposed in a vertical direction by only the first member 2 and the second member 3 and then inverted.

As a result, when the various processes, such as a cleaning process, are performed on the liquid crystal device 100, the posture of the liquid crystal device 100 can be more surely fixed by the third member 22 and the fifth member 24, and the fourth member 23 and the sixth member 25, regardless of whether the inversion is performed or not. Further, it is applicable to a case in which the liquid crystal device 100 is carried.

Therefore, the carrying of the liquid crystal device or various processes can be performed without directly holding the liquid crystal device 100, and when the carrying or various processes are performed in a state in which the FPC 7 is supported, it can be prevented that the liquid crystal device 100 is sagged downward in a heightwise direction and thus comes into contact with neighboring members.

Further, even in a state in which the FPC 7 is interposed by the third member 22 and the fifth member 24, and the fourth member 23 and the sixth member 25, the FPC 7 can be surely interposed by the first member 2 and the second member 3. Accordingly, even when the interposing of the FPC 7 by the third member 22 and the fifth member 24, and the fourth member 23 and the sixth member 25, since the FPC 7 is curved downward in a heightwise direction, the liquid crystal device 100 is not sagged downward in a heightwise direction.

Further, in the present embodiment, the flat surface of the neighboring portion 61 of the liquid crystal device 100 of the fourth member corves the external connecting terminal 102 and supports it. As a result, when the liquid crystal device 100 is carried or when the various processes are performed on the liquid crystal device 100, the connection between the front end of the FPC 7 and the external connecting terminal 102 can be surely protected.

Hereinafter, a modification will be described. In the present embodiment, the front end of the FPC 7 that is connected to the external connecting terminal 102 is supported by the flat surface of the neighboring portion 61 of the fourth member 23, but it may be supported by the flat surface of the neighboring portion 61 of the third member 22, in an interposing direction in a heightwise direction by the third member 22 and the fourth member 23.

Figure 21A:
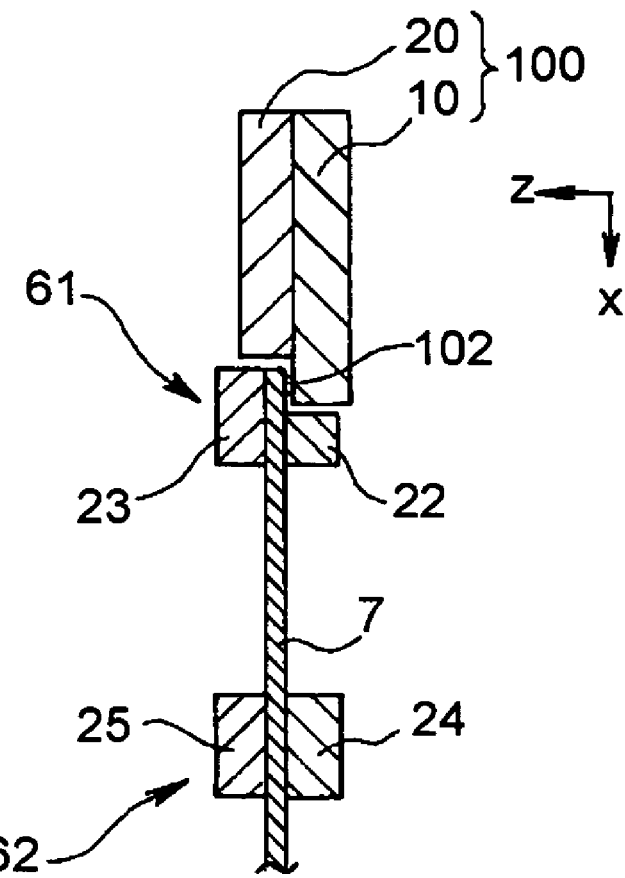
FIG. 21A is a cross-sectional view illustrating a modification of structures of third and fourth members shown in FIG. 19.
Figure 21B:
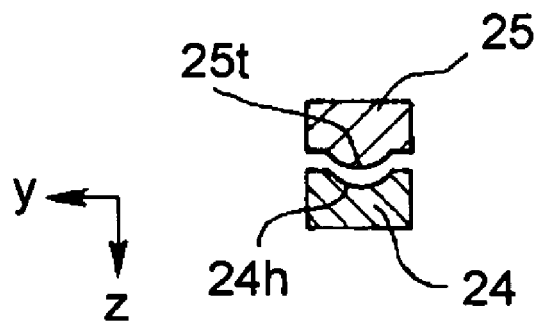

Hereinafter, another modification will be described. FIG. 21A is a cross-sectional view illustrating a modification of structures of third and fourth members shown in FIG. 19. FIG. 21B is a cross-sectional view in a case in which FIG. 21A is viewed from a longitudinal direction.

In the present embodiment, the top surface of the fifth member 24 and the bottom surface of the sixth member 25 are flat. However, the invention is not limited thereto. As shown in FIG. 21B, the concave portion 24h may be formed on the top surface of the fifth member 24, and the convex portion 25t may be formed in the bottom surface of the sixth member 25.

According to this structure, as shown in FIG. 21A, the connection between the front end 7u and the external connection terminal 102 can be surely protected by the flat surface of one of the third member 22 and the fourth member 23 of the neighboring portion 61 of the liquid crystal device 100. As shown in FIG. 21B, the FPC 7 of the spaced portion 62 can be surely curved along a downward longitudinal direction that is a direction of gravity through the fitting between the concave portion 24h of the fifth member 24 and the convex portion 25t of the sixth member 25.

Accordingly, the liquid crystal device 100 is not sagged downward in a heightwise direction due to the gravity applied to the liquid crystal device 100, and the posture of the liquid crystal device 100 can be held in a state in which the FPC 7 is supported.

Figure 22:
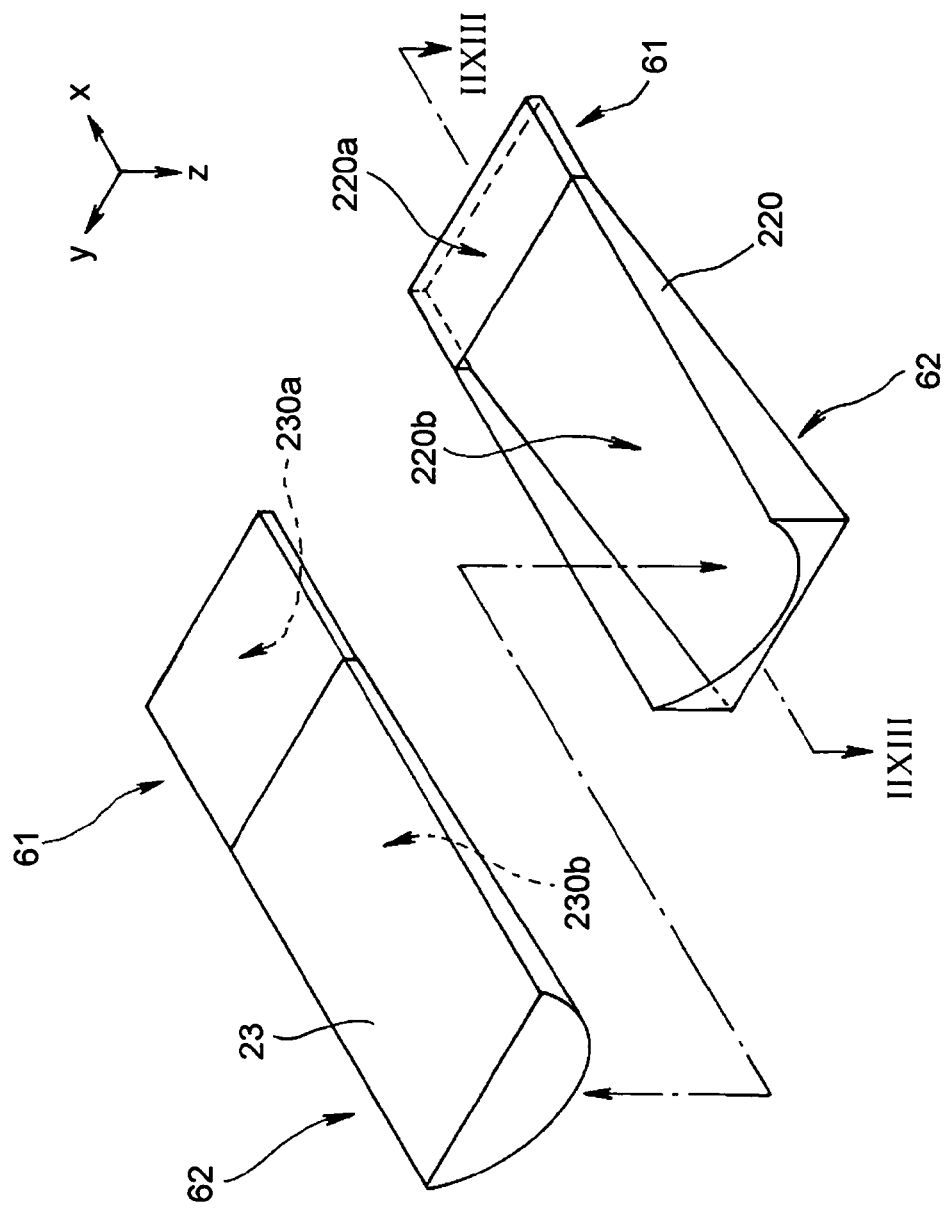
FIG. 22 is a perspective view illustrating another modification of structures of third and fourth members shown in FIG. 19.
Figure 23:
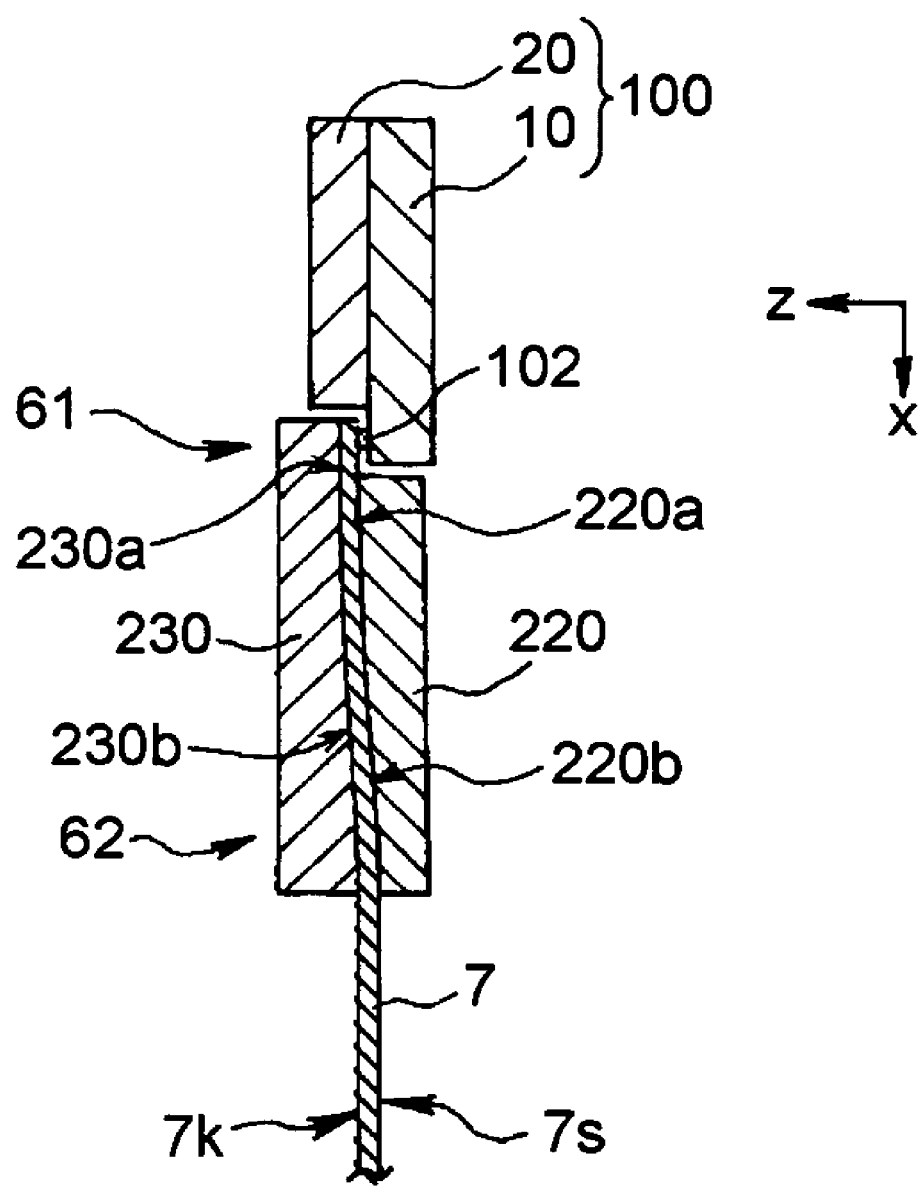
FIG. 23 is a cross-sectional view taken along the line XXIII-XXIII after an FPC is interposed between seventh and eighth members of FIG. 22.

Hereinafter, another modification will be described. FIG. 22 is a perspective view illustrating another modification of structures of third and fourth members shown in FIG. 19. FIG. 23 is a cross-sectional view taken along the line XXIII-XXIII after an FPC is interposed between seventh and eighth members of FIG. 22.

As shown in FIGS. 22 and 23, the third member 22 and the fifth member 24 may be connected to each other in a longitudinal direction so as to be integrally formed, and may form the seventh member 220. In the same manner, the fourth member 23 and the sixth member 25 may be connected to each other in a longitudinal direction so as to be integrally formed, and may form the eighth member 230.

The top surface serving as the supporting surface of the neighboring portion 61 of the liquid crystal device 100 of the seventh member 220, that is, the top surface of the third member 22 is formed of a flat surface 220a, and the top surface serving as the supporting surface of the portion 62 that is spaced apart from the flat surface 220a along a longitudinal direction, that is, the top surface of the fifth member 24 is formed of the bottom surface 220b of the concave portion that has a semicircular sectional shape inclined gradually downward from the flat surface 220a in a heightwise direction. That is, the bottom surface 220b is formed of a continuously inclined surface along a longitudinal direction that couples the bottom portion of the concave portion of the spaced portion 62 and the flat surface of the neighboring portion 61.

In this case, the neighboring portion 61 of the bottom surface 7s of the FPC 7 is supported by the flat surface 220a, and a region ranging from the neighboring portion 61 of the bottom surface 7s of the FPC 7 to the spaced portion 62 is supported by the continuously inclined bottom surface 220b.

Further, the bottom surface serving as the supporting surface of the neighboring portion 61 of the liquid crystal device 100 of the eighth member 230, that is, the bottom surface of the fourth member 23 is formed of a flat surface 230a, and the bottom surface serving as the supporting surface of the portion 62 that is spaced apart from the flat surface 230a along a longitudinal direction, that is, the bottom surface of the sixth member 25 is formed of the bottom surface 230b of the convex portion that has a semicircular sectional shape protruding gradually and continuously inclined from the flat surface 230a in a heightwise direction.

That is, the top surface 230b is formed of a continuously inclined surface along a longitudinal direction that couples the top portion of the convex portion of the spaced portion 62 and the flat surface of the neighboring portion 61. Further, the top surface 230b is freely fitted into the bottom surface 220b of the seventh member 220.

In this case, the neighboring portion 61 of the top surface 7k of the FPC 7 is supported by the flat surface 230a, and a region ranging from the neighboring portion 61 of the top surface 7 of the FPC 7 to the spaced portion 62 is supported by the continuously inclined top surface 230b.

As a result, when the FPC 7 is interposed in a vertical direction by the seventh member 220 and the eighth member 230, the FPC 7 is bent downward in a heightwise direction that is a direction of gravity through the fitting between the bottom surface 220b and the top surface 230b, and the connection between the front end of the FPC 7 and the external connecting terminal 102 is protected by the flat surface 230a of the neighboring portion 61.

As such, the connection between the front end of the FPC 7 and the external connecting terminal 102 can be surely protected. In addition, the FPC 7 can be surely bent along a downward longitudinal direction that is a direction of gravity through the fitting between the bottom surface 220b and the top surface 230b. Therefore, the liquid crystal device 100 is not sagged in a direction of gravity due to the gravity applied to the liquid crystal device 100, and the posture of the liquid crystal device 100 can be held in a state in which the FPC 7 is supported.

Further, the above-mentioned liquid crystal device is not limited to the above-mentioned embodiments and modifications, but various changes and modifications can be made without departing from the spirit and scope of the invention. For example, as the above-mentioned liquid crystal device, the active-matrix-type liquid crystal display module that uses the active elements (active elements) such as thin film transistors (TFTs) has been exemplified, but the invention is not limited thereto. It is possible to use an active-matrix-type liquid crystal display module that uses active elements (active elements), such as thin film diodes (TFDs).

Further, in the first and second embodiments, as the electro-optical device that is the held member supported by the supporting device, the liquid crystal device has been exemplified. The invention is not limited thereto. The invention may be applied to various electro-optical devices, such as an electroluminescent device (in particular, an organic electroluminescent device and an inorganic electroluminescent device), a plasma display device, an FED (Field Emission Device), an SED (Surface-Conduction Electron-Emitter Display) device, an LED (Light-Emitting Diode) display device, an electrophoresis device, a small-sized television using a thin brown tube or a liquid crystal shutter.

Further, the electro-optical device may be a display device where elements are formed on a semiconductor substrate, for example, LCOS (Liquid Crystal On Silicon). In the LCOS, a single crystal silicon substrate is used as an element substrate, and transistors serving as switching elements used in pixels or peripheral circuits are formed in a single crystal silicon substrate. In addition, in the pixels, reflective pixel electrodes are used, and various elements of the pixels are formed on lower layers of the pixels.

Further, the electro-optical device may be a display device a pair of electrodes are formed on the same layer of the one-side substrate, for example, IPS (In-Plane Switching) or a display device where a pair of electrodes are formed with an insulating film interposed therebetween in one-side substrate, for example, FFS (Fringe Field Switching).

What is claimed is:

1. An electro-optical device supporting device that interposes a flat flexible member extending from a held member in a vertical direction and holds the posture of the held member, the held member including:
    a substrate having a display region, and
    an electro-optical material in the display region of the substrate,
    the electro-optical device supporting device comprising:
    a first member that supports neighboring portions of both ends of the flat flexible member in a widthwise direction from a lower side of the flat flexible member; and
    a second member that pushes down a center portion of the flat flexible member in the widthwise direction from an upper side,
    wherein a concave portion is formed in the center portion of the first member in the widthwise direction, and a convex portion for deforming the flat flexible member by pushing down the flat flexible member is formed in the second member so as to correspond to the concave portion of the first member.

2. The electro-optical device supporting device according to claim 1,
    wherein the substrate includes
    pixel electrodes and switching elements provided to correspond to the pixel electrodes; and
    the held member further includes another substrate that is disposed so as to be opposite to the substrate, and
    an electro-optical material interposed between the substrate and the another substrate.

3. The electro-optical device supporting device according to claim 1,
    wherein the first member and the second member are integrally formed through a connection member.

4. The electro-optical device supporting device according to claim 1,
    wherein each of the first member and the second member is made of a flat member,
    the concave portion is formed by cutting a center portion of the flat member in the widthwise direction or disposing protrusion portions protruding upward from the flat member on both ends of the flat member in the widthwise direction, and
    the convex portion is formed by cutting regions excluding the center portion of the flat member or disposing a protrusion portion protruding downward from the flat member on the center portion of the flat member.

5. The electro-optical device supporting device according to claim 1,
    wherein each of the first member and the second member is made of a rod-shaped member.

6. An electro-optical device supporting device that interposes a flat flexible member extending from a held member in a vertical direction and holds the posture of the held member, wherein the flat flexible member is a flat flexible printed circuit that supply image signals to pixel electrodes, and the held member includes:
    a first substrate that has a display region where the pixel electrodes and switching elements provided to correspond to the pixel electrodes are formed;
    a second substrate that is disposed so as to be opposite to the first substrate; and
    an electro-optical material that is interposed between the first substrate and the second substrate;
    the supporting device comprising:
    a first member that supports neighboring portions of both ends of the flat flexible member in a widthwise direction from a lower side of the flat flexible member; and
    a second member that pushes down a center portion of the flat flexible member in the widthwise direction from an upper side,
    wherein a concave portion is formed in the center portion of the first member in the widthwise direction, and a convex portion for deforming the flat flexible member by pushing down the flat flexible member is formed in the second member so as to correspond to the concave portion of the first member.

7. An electro-optical device supporting device that interposes a flat flexible member extending from a held member in a vertical direction and holds the posture of the held member, comprising:
    a first member that supports neighboring portions of both ends of the flat flexible member in a widthwise direction from a lower side of the flat flexible member; and
    a second member that pushes down a center portion of the flat flexible member in the widthwise direction from an upper side;
    wherein a concave portion is formed in the center portion of the first member in the widthwise direction, and a convex portion for deforming the flat flexible member by pushing down the flat flexible member is formed in the second member so as to correspond to the concave portion of the first member;
    wherein each of the first member and the second member is made of at least three rod-shaped members that are disposed parallel to one another in the widthwise direction,
    the concave portion is formed by using a structure in which the rod-shaped member of the center portion in the widthwise direction is disposed at a lower location than the rod-shaped members of both ends in the widthwise direction, and
    the convex portion is formed by using a structure in which the rod-shaped member of the center portion in the widthwise direction protrudes to a lower location than the rod-shaped members of both ends in the widthwise direction.

8. The electro-optical device supporting device according to claim 7, further comprising:
a concavo-convex varying mechanism that varies the concave portion of the first member to the concave portion and varies the convex portion of the second member to the concave portion.

9. The electro-optical device supporting device according to claim 8,
wherein the rod-shaped member is constructed so as to freely move, and
the concavo-convex varying mechanism varies the concave portion of the first member to the convex portion and the convex portion of the second member to the concave portion by moving the rod-shaped portions of the center portions of the first member and the second member in a vertical direction.

10. The electro-optical device supporting device according to claim 8,
wherein the concavo-convex varying mechanism varies the concave portion of the first member to the convex portion by expanding the thin film of the center portion of the first member in an upward direction, and varies the convex portion of the second member to the concave portion by contracting the thin film of the center portion of the second member in an upward direction.

11. An electro-optical device supporting device that interposes a flat flexible member extending from a held member in a vertical direction and holds the posture of the held member, comprising:
a first member that supports neighboring portions of both ends of the flat flexible member in a widthwise direction from a lower side of the flat flexible member; and
a second member that pushes down a center portion of the flat flexible member in the widthwise direction from an upper side;
wherein a concave portion is formed in the center portion of the first member in the widthwise direction, and a convex portion for deforming the flat flexible member by pushing down the flat flexible member is formed in the second member so as to correspond to the concave portion of the first member;
wherein thin films that expand and contract by air are formed on surfaces of the first member and the second member that interpose the flat flexible member therebetween, and
the concave portion is formed by contracting a center portion of the thin film in the widthwise direction through air sucking, and the convex portion is formed by expanding the center portion of the thin film through air injecting.

12. An electro-optical device supporting device that interposes a flat flexible member extending from a held member in a vertical direction and holds the posture of the held member, comprising:
a first member that supports neighboring portions of both ends of the flat flexible member in a widthwise direction from a lower side of the flat flexible member;
a second member that pushes down a center portion of the flat flexible member in the widthwise direction from an upper side, wherein a concave portion is formed in the center portion of the first member in the widthwise direction, and a convex portion for deforming the flat flexible member by pushing down the flat flexible member is formed in the second member so as to correspond to the concave portion of the first member; and
an inversion mechanism that inverts the flat flexible member such that the second member supports the flat flexible member from a lower side of the flat flexible member, in a state in which the flat flexible member is interposed between the first member and the second member.

13. An electro-optical device supporting device that interposes a flat flexible member extending from a held member in a vertical direction and holds the posture of the held member, comprising:
a first member that supports neighboring portions of both ends of the flat flexible member in a widthwise direction from a lower side of the flat flexible member;
a second member that pushes down a center portion of the flat flexible member in the widthwise direction from an upper side, wherein a concave portion is formed in the center portion of the first member in the widthwise direction, and a convex portion for deforming the flat flexible member by pushing down the flat flexible member is formed in the second member so as to correspond to the concave portion of the first member;
a third member that supports the flat flexible member from a lower side at a neighboring portion of the held member;
a fourth member that supports the flat flexible member from an upper side at a neighboring portion of the held member;
a fifth member that supports the flat flexible member from a lower side at a spaced portion that is spaced apart from the held member; and
a sixth member that supports the flat flexible member from an upper side at a spaced portion that is spaced apart from the held member,
wherein the flat flexible member is interposed in a vertical direction by the third member and the fifth member, and the fourth member and the sixth member.

14. The electro-optical device supporting device according to claim 13,
wherein the third member and the fourth member are integrally formed through a connection member.

15. The electro-optical device supporting device according to claim 13,
wherein the fifth member and the sixth member are integrally formed through a connection member.

16. The electro-optical device supporting device according to claim 13,
wherein the first member and the second member interpose the flat flexible member between the third member and the fifth member, and the fourth member and the sixth member in a vertical direction.

17. The electro-optical device supporting device according to claim 13,
wherein the flat flexible member is connected to connection terminal portions that are formed in one of the first substrate and the second substrate, and
one of the third member and the fourth member located at the neighboring portions of the held member cover and support the flat flexible member that are connected to the connection terminal portions.

18. The electro-optical device supporting device according to claim 13,
wherein supporting surfaces of the third member and the fifth member, and the fourth member and the sixth member that support the flat flexible member are flat.

19. The electro-optical device supporting device according to claim 13,
wherein supporting surfaces of the third member and the fourth member are flat, and
a concave portion is formed in a supporting surface of the fifth member, and a convex portion is formed in a supporting surface of the sixth member.

20. The electro-optical device supporting device according to claim 19,
wherein the third member and the fifth member are integrally formed so as to form a seventh member,
the fourth member and the sixth member are integrally formed so as to form an eighth member,
a supporting surface of the seventh member for supporting the flat flexible member is formed of a continuously inclined surface that couples a bottom portion of the concave portion of the fifth member with the flat surface of the third member, and
a supporting surface of the eighth member for supporting the flat flexible member is formed of a continuously inclined surface that couples a top portion of the convex portion of the sixth member with the flat surface of the fourth member.

21. A method of supporting an electro-optical device, comprising:
supporting neighboring portions of both ends of a flat flexible member extending from a held member in a widthwise direction from a lower side of the flat flexible member, by a first member where a concave portion is formed in a center portion of the first member in the widthwise direction, wherein the held member comprises a substrate having a display region and an electro-optical material in the display region of the substrate;
interposing a center portion of the flat flexible member in the widthwise direction between the first member and a second member where a convex portion is formed; and
pushing down the concave portion by the convex portion so as to push down and deform the flat flexible member.

* * * * *